United States Patent [19]

Ohta et al.

[11] Patent Number: 4,614,954
[45] Date of Patent: Sep. 30, 1986

[54] RECORDING APPARATUS

[75] Inventors: Morio Ohta; Shizuo Tsuchiya; Yoshito Nakano; Masaru Aikawa; Seiji Asaumi, all of Musashimurayamashi, Japan

[73] Assignees: Casio Computer Co., Ltd.; Casio Electronics Mfg. Co. Ltd., both of Tokyo, Japan

[21] Appl. No.: 649,851

[22] Filed: Sep. 12, 1984

[30] Foreign Application Priority Data

Jan. 23, 1984 [JP] Japan .................................. 59-8607
Mar. 31, 1984 [JP] Japan .................................. 59-64753

[51] Int. Cl.⁴ .................. G01D 15/14; G01D 15/06; G01D 9/42; G02F 1/13
[52] U.S. Cl. .................. 346/160; 346/107 R; 346/154; 350/332; 350/333
[58] Field of Search .............. 350/346, 333, 331 T, 350/330, 332; 346/160, 154, 107 R, 108, 153.1

[56] References Cited

U.S. PATENT DOCUMENTS 4,096,486  6/1978  Pfeifer et al. .................. 346/107 R
4,236,150 11/1980  Chern ........................... 350/331 T X
4,386,836  6/1983  Aoki et al. ..................... 350/346 X

FOREIGN PATENT DOCUMENTS 176620 10/1983 Japan .................................. 350/346

Primary Examiner—E. A. Goldberg
Assistant Examiner—Linda M. Peco
Attorney, Agent, or Firm—Sandler & Greenblum

[57] ABSTRACT

In a recording apparatus of this invention, liquid crystal light shutter operates by using the double frequency drive. The double frequency drive employs a high frequency $f_H$ and lower frequency $f_L$. The dielectric anisotropy becomes positive in the case of the lower frequency $f_L$ than crossover frequency $f_C$ and becomes negative in the case of the higher frequency $f_H$ than the frequency $f_C$ of liquid crystal material. The driver circuit of liquid crystal light shutter includes a delay circuit (146). Both a recording data delayed through the delay circuit (146) and a recording data formed without going through the delayed circuit (146) are produced in an LSI, to be supplied to write selecting electrodes and signal electrodes of the liquid crystal light shutter, thereby driving the liquid crystal light shutter in a time sharing manner.

5 Claims, 56 Drawing Figures

F I G. 12
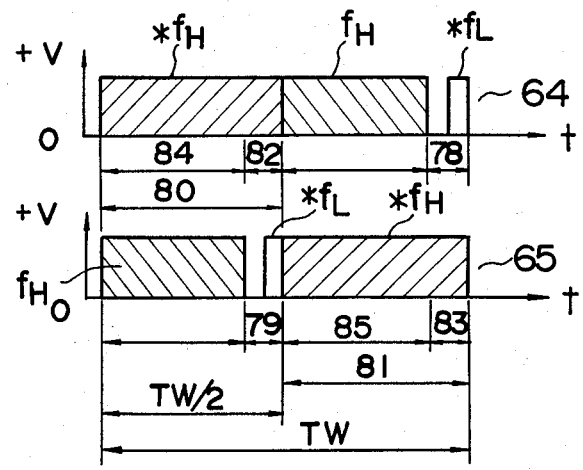
F I G. 13
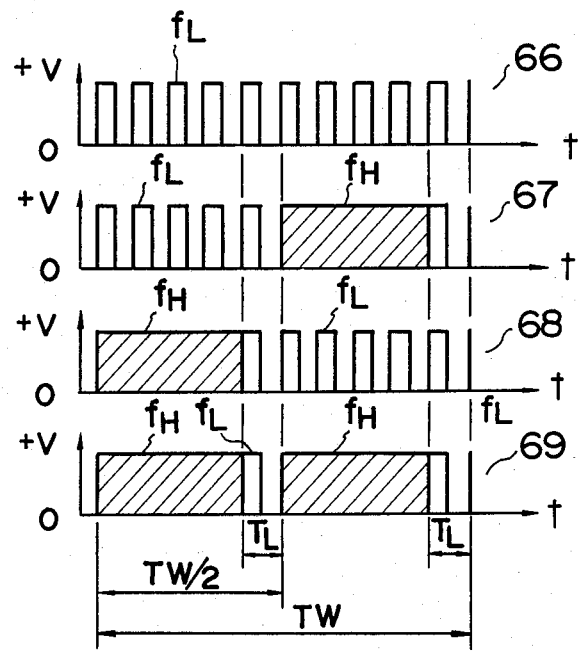

FIG. 17 A
FIG. 17 B
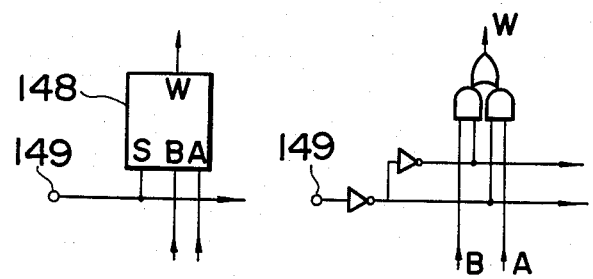
FIG. 18
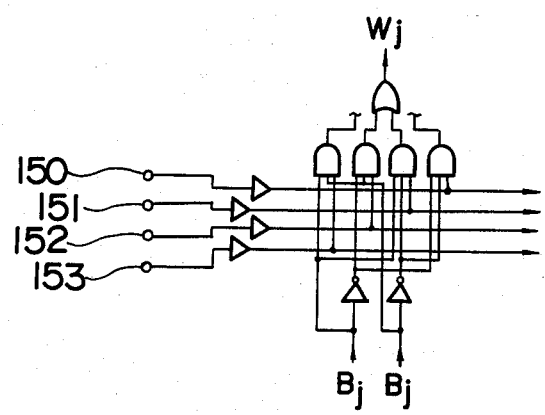

F I G. 23
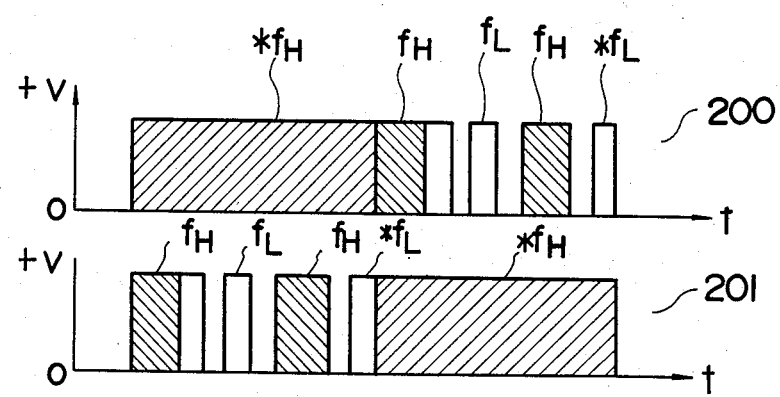

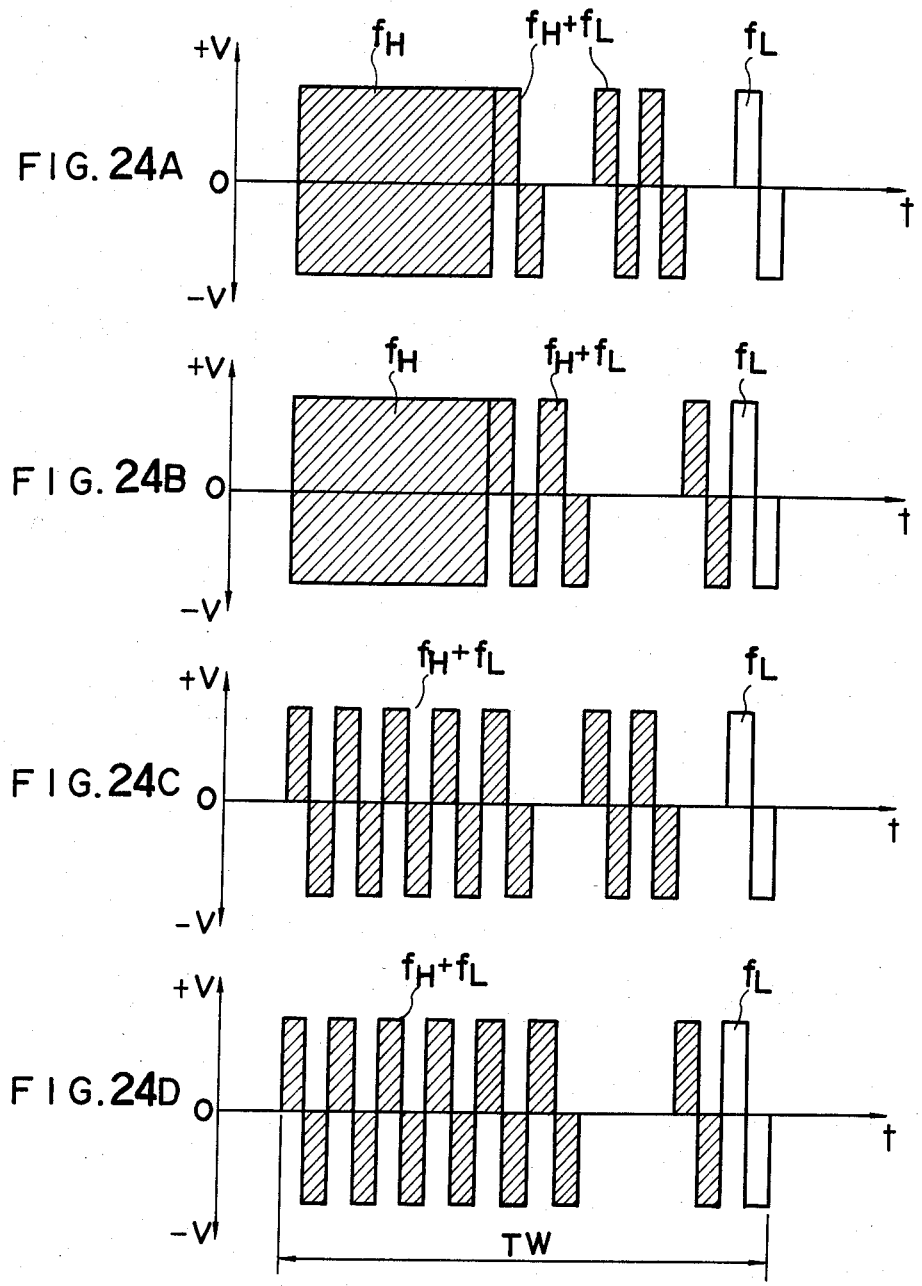

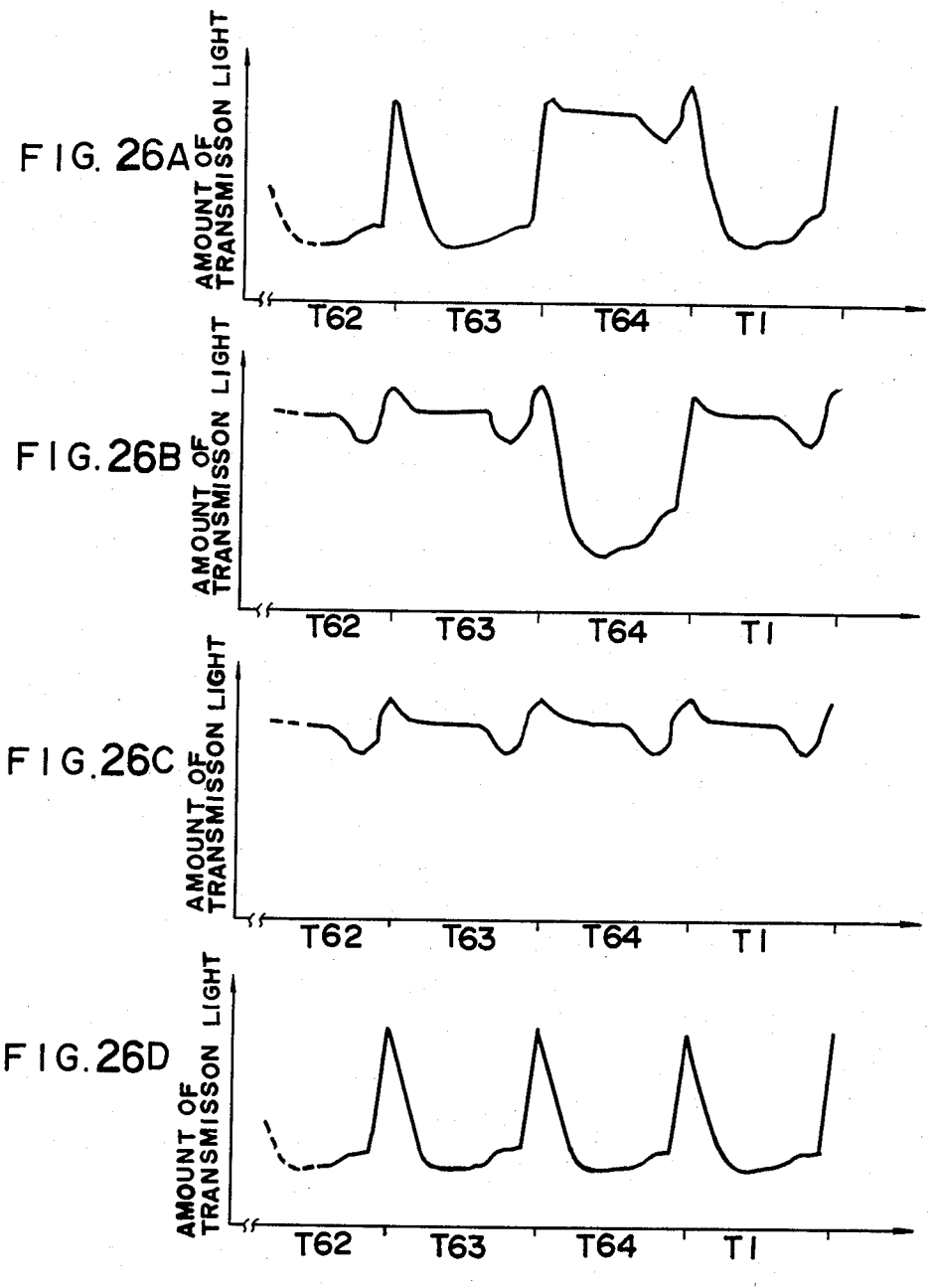

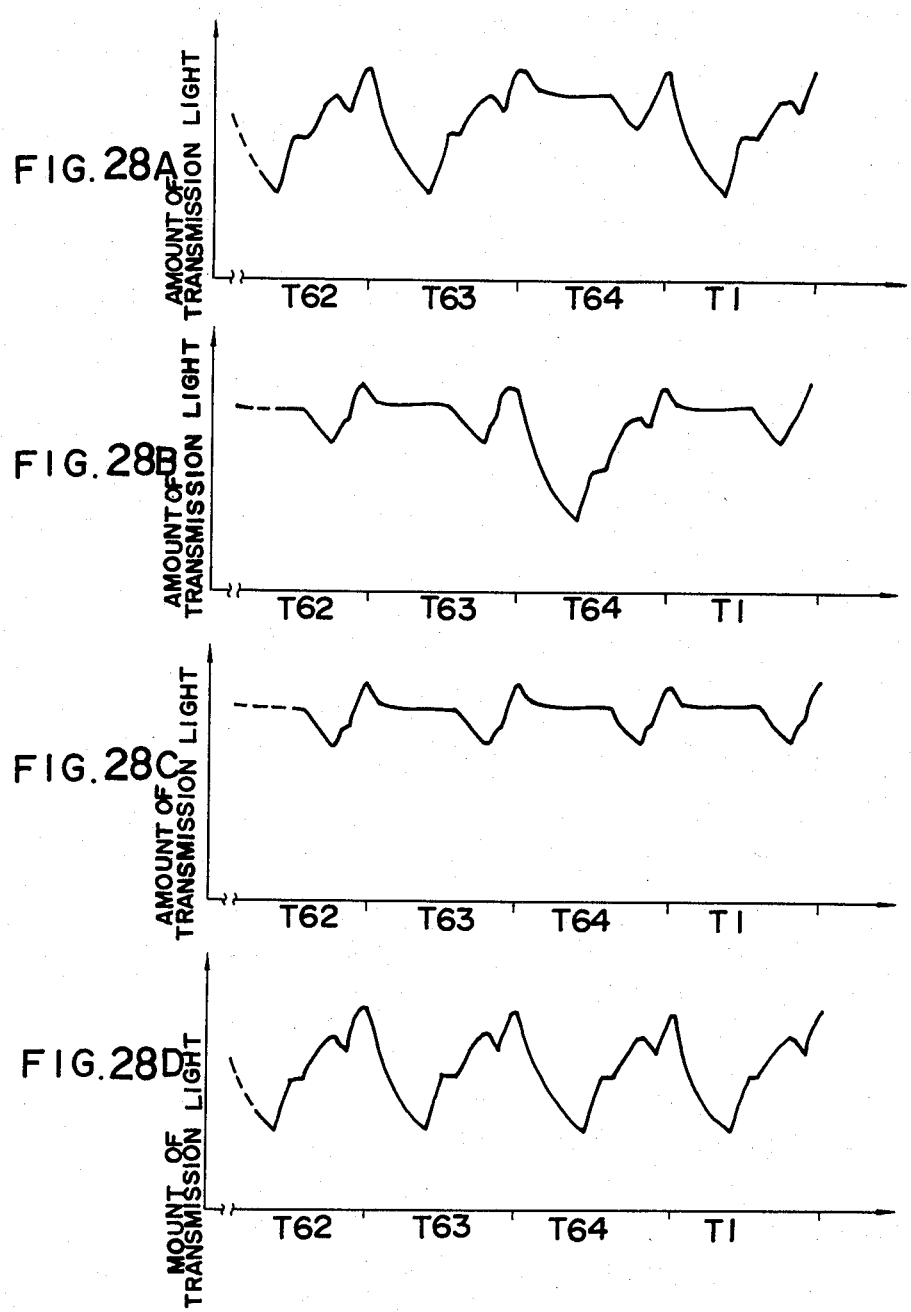

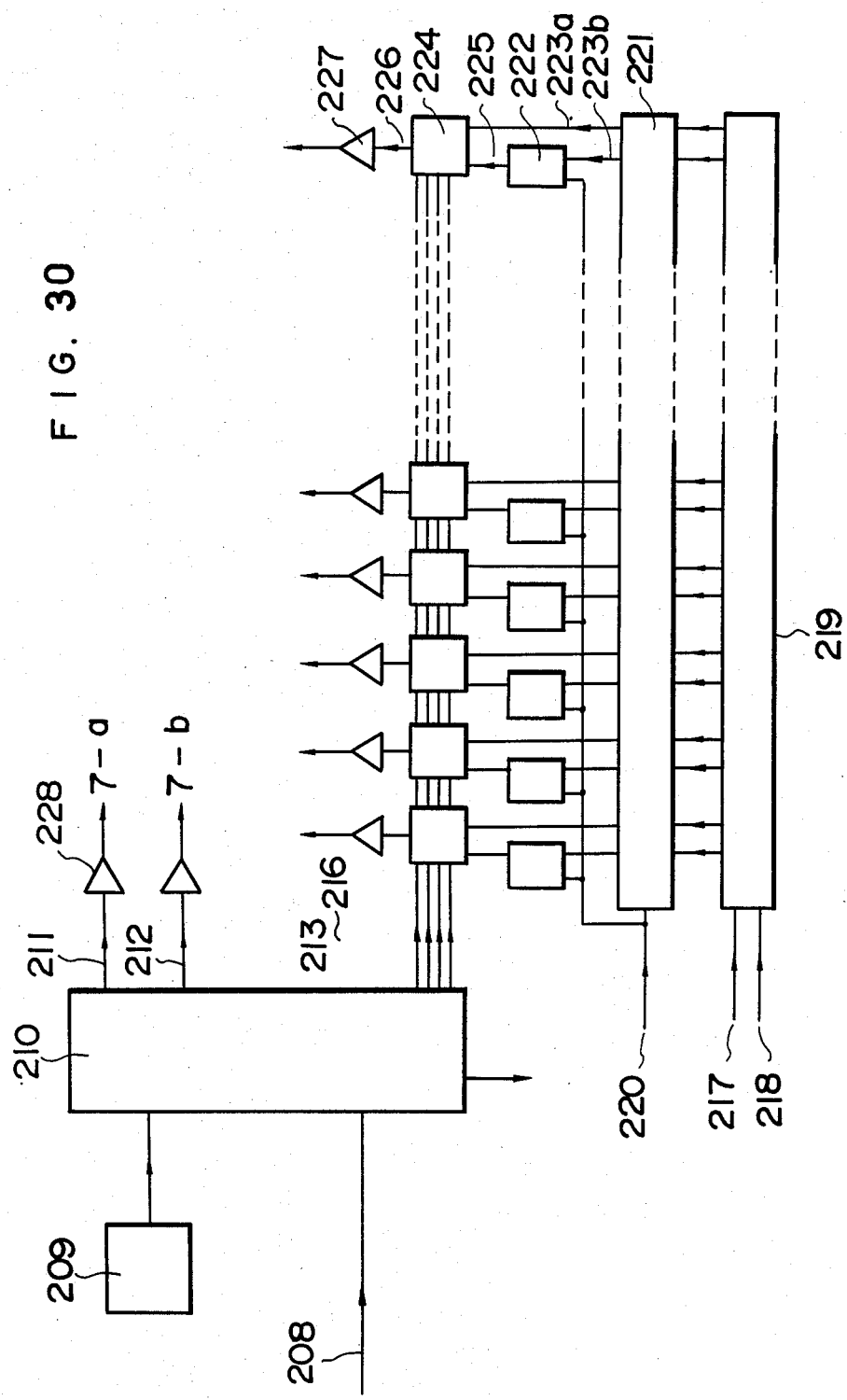

RECORDING APPARATUS

BACKGROUND OF THE INVENTION

1. Field of the Invention

This application is related to pending U.S. application No. 650,521, filed on Sept. 14, 1984 in the name of OHTA et al., entitled RECORDING APPARATUS.

The present invention relates to a recording apparatus in which electric optical converter elements such as liquid crystal light shutter and LED are incorporated, and more particularly, it relates to a recording apparatus which allows buffers to be eliminated from the external circuit of the recording apparatus.

2. Prior Art

The impact printer which impacts the ribbon on a sheet of paper to achieve mechanical printing has been used for a long time as a terminal instrument for computer outputs. This impact printer is excellent in the quality of letters printed and has high reliability, but it cannot meet the needs of customers because the printing speed and the amount of information have increased these days.

On the contrary, the non-impact printer which does not perform mechanical printing but produces images using electrostatic development or the like can achieve recording in free format basically by changing external inputs and therefore record symbols, lines and image information, in addition to character information. The non-impact printer employs one of the optical, magnetic, electrostatic and thermal recording manners, and the optical recording manner is the best to meet any of uses including from low to high speed operations.

In the case of this optical recording manner, light converter elements such as laser, OFT, LED and LCD are used to write image information on the light conductive recording body, but the light scanning system for producing laser beam becomes complicated when the laser is used, and the laser device is expensive. In addition, there is a problem of how the stability of laser beam output is matched with the light conductive recording medium. More specifically, the luminous wavelength of laser ranges 630–820 nm and is shifted from the spectral sensitivity range of the light conductive recording body which is usually used by the copying machine, so that sensitivity lack of the light conductive recording body always presents a problem. When sensitisation is made to the side of long wavelength to compensate the sensitivity lack, the light conductive recording body becomes too sensitive to environmental conditions such as temperature. The recording apparatus in which the liquid crystal light shutter are incorporated can be cited as one to eliminate the above-mentioned drawbacks.

The liquid crystal light shutter will be described. Two driver modes of the guest-host effect mode (which will be hereinafter referred to as GH effect mode) and the twisted-nematic effect mode (which will be hereinafter referred to as TN effect mode) typical in the electric optical effect of liquid crystal will be described at first.

FIGS. 1(A) and 1(B) are intended to explain GH effect mode while FIGS. 1(C) and 1(D) TN effect mode. The liquid crystal cell of GH effect mode comprises solving a guest dye in the host liquid crystal. As shown in FIGS. 1(A) and 1(B), for example, incident light 1 which is natural light becomes a light 3 which has been linearly polarized by a polarizer 2 such as Nicol's prism and Gramthomson's prism to enter into a liquid crystal cell 4. The liquid crystal cell 4 consists of liquid crystal particles 5 and dichroic dye particles 6, and these liquid crystal and dichroic due particles 5 and 6 perform directional movement due to external electric field. The dichroic dye particles 6 absorb more light in their major axis than in their minor axis. Therefore, the linearly polarized light 3 which is incident upon the liquid crystal cell 4 is absorbed to emit no light outside when the liquid crystal and dichroic dye particles 5 and 6 are arranged as shown in FIG. 1(A). This means that the liquid crystal cell 4 is closed when it is used as a liquid crystal light shutter. When the liquid crystal and dichroic dye particles 5 and 6 are so arranged as not to absorb the incident light 3 as shown in FIG. 1(B), a light 7 is emitted from the liquid crystal cell 4. This means that the liquid crystal cell 4 is opened when it is used as the liquid crystal light shutter.

A liquid crystal cell 8 shown in FIGS. 1(C) and (D) comprises arranging its liquid crystal particles 9 parallel to the panel plane, twisting it by 90 degrees between electrodes, and sandwiching it between two polarizers 10 and 11. The positioning of the polarizers 10 and 11 relative to the polarizing plane is done according to the homeotropic nicol arrangement as shown in FIGS. 1(C) and 1(D) as well as the parallel nicol arrangement. The opened and closed operations of the liquid crystal cell in the parallel nicol arrangement becomes opposite to those in the homeotropicnicol arrangement which will be described below. In FIG. 1(C), incident light 12 is linearly polarized by the polarizer 10 to enter into the liquid crystal cell 8 of the TN effect mode. Since the liquid crystal particles 9 are twisted by 90 degrees, the polarizing plane of output light 14 is turned by 90 degrees when it receives light 13, to thereby enter the light 14 into the polarizer 11. Since the plane by which the light 14 is polarized is parallel to the polarizing plane of the polizer 11, the light 14 can penetrate through the polizer 11 to thereby emit light 15, which means that the liquid crystal cell 8 becomes opened as the liquid crystal light shutter.

When the liquid crystal particles 9 are vertically arranged as shown in FIG. 1(D), the output light 14 which is not optically rotated in the liquid crystal cell 8 of the TN effect mode is made perpendicular to the polarizing plane of the polarizer 11. Therefore, the output light 14 cannot penetrate through the polarizer 11, which means that the cell 8 becomes closed as the liquid crystal light shutter.

The method of driving this liquid crystal light shutter will be described next. Double frequency drive is usually used to drive the liquid crystal light shutters.

The double frequency drive is intended to rearrange the liquid crystal particles, changing the frequency of electric field and using its inversion due to dielectric anisotropy. As shown in FIG. 2, for example, the dielectric anisotropy $\Delta \epsilon$ becomes positive in the case of a frequency (which will be hereinafter referred to as $f_L$) lower than a crossover frequency (which will be hereinafter referred to as $f_C$). On the contrary, the dielectric anisotropy becomes negative in the case of a frequency (which will be hereinafter referred to as $f_H$) higher than the frequency $f_C$. When a signal having the frequency $f_L$ is applied, the liquid crystal particles are arranged parallel to the electric field, while when a signal having the frequency $f_H$ is applied, they are arranged transverse to the electric field.

The dielectric anisotropy Δε is sensitive to viscosity and therefore changes largely responsive to temperature change. When viscosity changes, the frequency $f_C$ also changes. When temperature rises from 20° C. to 40° C., for example, the frequency $f_C$ also rises from 5 KHz to 46 KHz. When viscosity is low, therefore, the action of the liquid crystal particles becomes so quick that high speed response can be expected. It is therefore desirable that temperature is raised to some extent when used.

Providing that the size of transferring sheets employed by the recording apparatus is A3 and that recording density is 10 dots/mm, a micro-shutter having a capacity of about 3000 dots/row will be needed. When the liquid crystal light shutters having a large recording capacity like this are to be statically driven, driver elements, number of lines and packaging area are increased to thereby make the cost higher and also make it difficult to package the number of lines and their connection.

The above-mentioned drawbacks could be conventionally reduced by time-sharing drive. However, this time-sharing drive caused the following problem.

The object of the time-sharing drive performed by the display means is eyes of people and therefore, the drive may be done, keeping the display so bright as not to make the eyes of people feel discomfort because of flickering, for example. Therefore, the number of time-sharing, writing cycle and the like are determined by the response speed of display elements, magnitude of output energy, display capacity and the like.

The time period which is assigned to a selected group by conducting n-time-sharing drive is shorter than Tw/n, providing that the writing cycle is Tw. When n-time-sharing drive is applied to the liquid crystal light shutters according to the conventional manner, therefore, the time during which the liquid crystal light shutters are opened becomes less than 1/n and the amount of exposure which is applied to the photoreceptor also becomes less than 1/n, so that lack of light quantity becomes severer as the number n of time-sharing drive becomes larger.

In a case where the liquid crystal light shutters 16 aligned on a line are grouped into m units, the write selecting electrodes are n units including $C_1-C_n$, the recording signal electrodes are m units including $S_1-S_m$, the moving or subscanning direction of the photoreceptor is represented by 17 in FIG. 3(C), and the time-sharing drive is performed as shown in FIG. 3(B), the write selecting electrodes $C_1, C_2, -C_n$ are selected at a timing $A_1, A_2, -A_n$, respectively, to perform recording. The liquid crystal light shutters 16 aligned on a line are to be recorded as shown by a broken line 18 in FIG. 3(C), but they are recorded inclined as shown by solid lines 19 in FIG. 3(C) because their recording times are different from one another, depending upon the time-sharing drive. The degree of this inclination 19a represents the moving distance of the photoreceptor drum which moves for the writing cycle Tw.

In the case where the liquid crystal light shutter are employed, the time-sharing drive which is performed in same manner as in the case of the display means is not satisfactory because of reduction of exposure and from the viewpoint of recording quality, as described above.

The driver circuit for time-sharing drive of the liquid crystal light shutters also needs delay and composite circuits. In the case of conducting n-time-sharing drive, for example, it is necessary to produce mixed recording data, which comprises delaying data, which is applied to each of the liquid crystal light shutters, by 1/n for the writing cycle Tw. FIG. 4 A is a block diagram showing a circuit for producing this mixed data.

An image signal generator section 20a generates a time-belonging picture element signa) 20C, synchronous with the rising of a clock pulse 20b, and this time-belonging picture element signal 20C is sent to an MUX gate 20d and applied, at the same time, to a data delay section 20f in which k-unit of m-bit shift registers 20e are connected in serial to delay k lines. k is 3 in the case shown in FIG. 4. A data signal 20g which has been delayed at the data delay section 20f, corresponding to the k lines is inputted to the MUX gate 20d and mixed with the time-belonging picture element signal 20c to produce a recording data 20h. This recording data 20h is controlled by the clock pulse 20b inputted to a D type FF 20i and also by a signal 20p generated by a transferred enable signal 20j.

The clock pulse 20b is also supplied to an AND gate 201 via an inverter 20k and cooperated with the transferred enable signal 20j to generate a clock pulse 20m, which is supplied to a liquid crystal light shutter driver circuit. When the mth-bit of the mixed recording data 20h which corresponds to one line is sent to the liquid crystal light shutter driver circuit, synchronous with the rising of the clock pulse 20m, a latch pulse 20n is generated at the image signal generator section 20a and supplied to the liquid crystal light shutter driver circuit, so that data which corresponds to one line is shifted to the data latch in the driver circuit, thereby causing the shift register to be made free and ready for an input applied from the subsequent line.

In FIG. 4(B), a symbol * represents a data which has been delayed by the k lines (k is 3 in this case).

Depending upon the way of supplying the recording data, two manners can be imagined to form the driver circuit, and which manners are shown in FIG. 5 as driver circuits 90 and 103. It is assumed that the total number of the liquid crystal light shutters 88 and 89 is m (which is an even number). The driver circuit 90 comprises an m-bit shift register 91, m-bit data latch 92, m-bit data selector 93, level shifter and high voltage drivers 94a and 94b. The m-bit shift register 91 alternately receives for the writing cycle Tw the m-bit of the recording data relative to the liquid crystal light shutter 88 and the m-bit of the recording data relative to the liquid crystal light shutter 89 which has been delayed by the k lines to compensate the positional error between the liquid crystal light shutters 88 and 89. One of recording data lines 95 is selected by the data selector 93, according to the mixed recording data shifted to the data latch 92 responsive to a latch pulse 92a, and it is sent to the level shifter and high voltage drivers 94a.

On the other hand, a write selecting signal 96 is inputted, as write selecting signals 98 and 99, to write selecting electrodes of the liquid crystal light shutters by means of the level shifter and high voltage drivers 94b. To explain signals inputted to recording signal electrodes more concretely, a mixed recording data 101 is inputted to the m-bit shift register 91, synchronous with a writing cycle signal 100, and shifted to the data latch 92 responsive to a latch pulse 102, as shown in FIG. 7. The recording signals 95 which correspond to the liquid crystal light shutters 88 and 89 are selected by the data selector 93, and one of the recording signals 95 is inputted to the recording signal electrode through the level shifter and high voltage drivers 94a.

Another example of the driver circuit which is represented by numeral 103 in FIG. 5 comprises an m/2-bit shift register 104, m/2-bit data latch 105, m/2-bit data selector 106 and level shifter and high voltage drivers 94a and 94b. The recording data relative to the liquid crystal light shutter 88 and the recording data relative to the liquid crystal light shutter 89 which has been delayed by the k lines are separated to occupy the front and back halves of the writing cycle Tw, respectively, and then inputted. One of recording signals 97 is selected by the data selector 106, responsive to the separated recording data shifted to the data latch 105, and it is sent to the level shifter and high voltage driver 94a. More specifically, a recording signal 110 which has been separated as signals 108 and 109 synchronous with the writing cycle signal 100 is received by the shift register 104 and shifted to the data latch 105 responsive to a latch pulse 111, as shown in FIG. 7. The recording data 110 is then inputted to the recording signal electrode, as described above. The recording data 108 is for the liquid crystal light shutter 88, while the recording data 109 is delayed by the k lines and for the liquid crystal light shutter 89 which is separated by a distance l from the shutter 88.

As apparent from the two above-described examples, $2^{n-1}$ kinds of driver signals are supplied at the time of non-selection in the n-time-sharing drive, whichever driving manner may be employed.

When the above-mentioned driver circuits 90 and 103 are employed in the time-sharing drive, the driving state for a selection period Tw/n can be kept during a non-selection period (1-1/n)Tw of the write selecting signal electrodes and operate apparently like static drive to prevent the exposure time to be reducded remarkably. The manners shown in FIGS. 4 and 5 is required to be used to produce the mixed recording data shown in FIG. 6, as described above.

The micro-shutters are usually arranged in zigzag in the liquid crystal light shutter, and when m units of the micro-shutters are arranged in it, delayed k lines, the bit number of the shift register 20e shown in FIG. 4A becomes m by k.

In order to do recording on a sheet of A3 size at a recording density of 10 dots/mm, for example, about 3,000 units of the micro-shutters are needed, and the shift register having a capacity of 9,000 bits is needed to achieve the 3-line delay. When a RAM (or random access memory) is employed, this capacity may be doubled.

Because the shift register and the RAM having this capacity were used as elements different from each other, the print plate became large and wires were needed between these elements, thereby making it troublesome to package the liquid crystal light shutter driver circuit.

SUMMARY OF THE INVENTION

The present invention is therefore intended to eliminate the above-mentioned drawbacks and the object of the present invention is to provide a recording apparatus wherein data delaying and mixing sections are included in a driver LSI to reduce the cost remarkably.

The object of the present invention can be achieved by a recording apparatus comprising spot light generator means arranged to form m rows and n columns and shifted in position from one another in the row direction, control means for controlling the spot light generator means, and an image recording means for receiving lights from the spot light generator means, which are controlled by the control means, to record images, where write selecting signals which are different in phase from one another and recording signals which cause the spot light generator means to be turned on and off according to recording data are supplied by the control means to write selecting electrodes each being arranged at each row of the spot light generator means and recording signal electrodes each being arranged at each column of the spot light generator means respectively, and wherein said control means comprises a data storing means for storing recording data of bits m×n and generations parallel outputs, by delay means connected to those outputs of said data storing means which are except those outputs of said data storing means which correspond to specified row of the spot light generator means and a supply controlling means for controlling both those outputs of the data storing means which correspond to the specified rows of the spot light generator means, and those outputs of the data storing means which are delayed by the delay means, and supplying them to the recording signal electrodes.

BRIEF DESCRIPTION OF THE DRAWINGS

FIG. 12 is a write selecting signal view intended to explain the 2-time-sharing drive used by the present invention.

FIG. 13 is a recording signal view intended to explain the 2-time division drive used by the present invention.

FIGS. 17 and 18 are circuit diagrams showing in more detail a part of the drive controlling circuit shown in FIG. 16.

FIG. 23 shows signal waveforms applied to write selecting electrodes.

FIGS. 24A to 24D are drive waveforms composed of the waveforms shown in FIG. 23 and partically applied to the liquid crystal.

FIGS. 26A to 26D, 27A to 27D, and 28A to 28D are views showing performances of micro-shutters at 46° C., 43° C. and 53° C., respectively.

FIG. 30 is a block diagram showing a driver circuit for the micro-shutters.

DETAILED DESCRIPTION OF THE INVENTION

An example of the recording apparatus according to the present invention will be described in reference to the accompanying drawings. A recording apparatus in which liquid crystal light shutter are incorporated will be described at first referring to FIGS. 8A, 8B and 9.

Figure 8A:
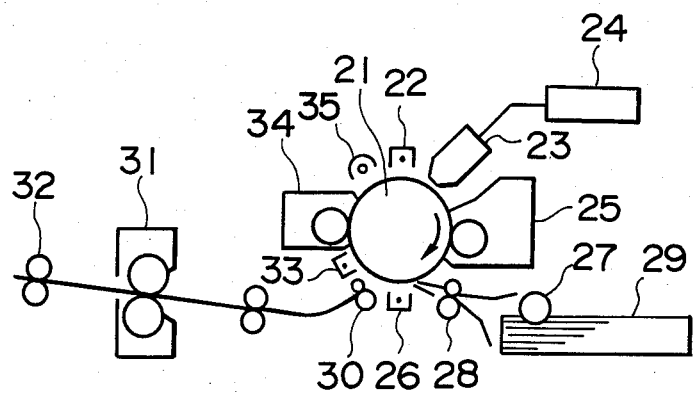
FIGS. 8(A) and 8(B) are block diagrams showing an example of the recording apparatus according to the present invention.

In FIG. 8(A), the surface of a photosensitive drum (or light conductive recording body) 21 is previously and uniformly electrified by an charged section 22. A liquid crystal light shutter section 23 is driven by a signal applied from a record controlling section 24 which receives recording information to control timings and the like, to thereby electrically and optically convert information and perform optical writing on the sensitive surface of the photosensitive drum 21. A static latent image thus formed is developed to visible image with toner at a developing section 25. The visible image is transferred by a transferring means 26 on a sheet of paper 29 fed from a paper supply roller 27 through holding rollers 28. The paper 29 is separated from the sensitive surface of the photosensitive drum 21 at a separating section 30 and discharged outside by discharging rollers 32 after the toner image is fixed on the paper 29 at a fixing section 31. On the other hand, the sensitive surface of the photosensitive drum 21 has its toner charge eliminated at a charge eliminating section 33 and its remaining toner cleaned at a cleaning section 34, and still-remaining charge is then removed from the sensitive surface of the photosensitive drum 21 by means of an eraser 35. The static latent image is made visible like this to form a recording image.

Figure 8B:
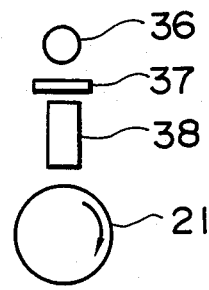
Figure 9:
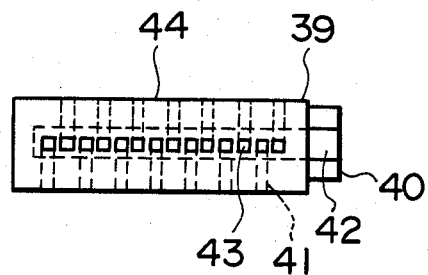
FIG. 9 is a block diagram showing a liquid crystal light shutter section.

FIG. 8(B) shows an arrangement of the liquid crystal light shutter section 23 employed by the above-described recording apparatus. The liquid crystal light shutter section 23 shown in FIG. 8(B) comprises a light source 36, liquid crystal light shutter 37 and imaging lens 38. As shown in FIG. 9, the liquid crystal light shutter 37 comprises sealing a liquid crystal material between two glass plates 39 and 40 wherein the glass plate 39 is provided with signal electrodes 41 alternately arranged thereon while the glass plate 40 is provided with common electrodes 42. Micro-shutters 43 are formed at those areas where the signal and common electrodes 41 and 42 are crossed each other, and each of them comprises a transparent electrode having necessary size and form and made of indium oxide ($In_2O_3$), tin oxide ($SnO_2$), or the like. The liquid crystal light shutter 37 is formed by adding at least one sheet of polarizing plate to a liquid crystal panel 44 which is arranged as described above. Incident light from the light source 36 is modulated by the liquid crystal light shutter 37 in response to a recording signal and radiated on the photosensitive drum 21 through the imaging lens 38.

Figure 10:
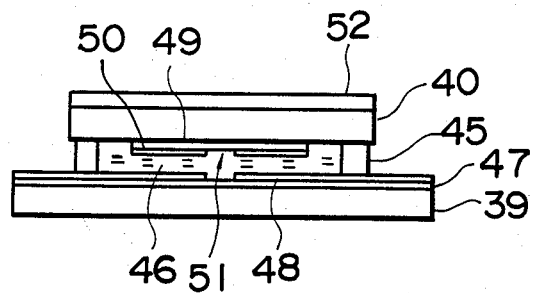
FIG. 10 is a sectional view showing a liquid crystal light shutter of the GH type used by the present invention.

FIG. 10 shows a construction of the liquid crystal light panel 44. A gap is kept between the two glass plates 39 and 40 by means of a spacer 45 and the liquid crystal material 46 controlled by double frequency driving is sealed in the gap. The signal electrode 41 (FIG. 9) consists of transparent and metal electrodes 47 and 48, while the common electrode 42 (FIG. 9) of transparent and metal electrodes 49 and 50. The micro-shutter 43 (FIG. 9) is formed at an area where a part of the metal electrodes 47 and 48 is removed. A polarizing plate 52 is positioned above the micro-shutters 43 (FIG. 9).

There will be described about the drive of the liquid crystal light shutter which is employed by the recording apparatus and which is arranged as described above, and particularly about the arrangement of the signal electrodes, common electrodes and micro-shutters in the case of performing the 2-time-sharing drive.

Figure 11:
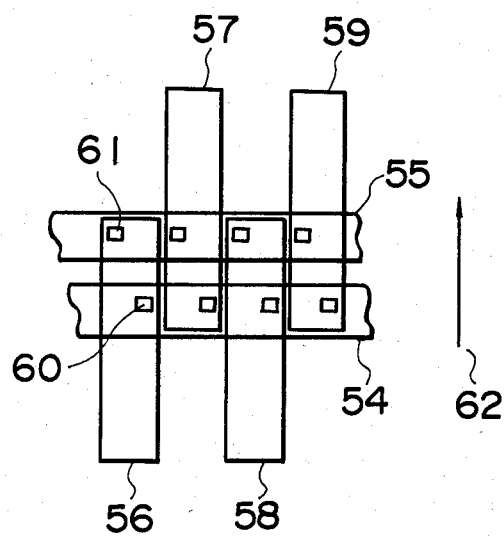
FIG. 11 is a view intended to explain an arrangement of micro-shutters in 2-time-sharing drive.

In FIG. 11, numerals 54 and 55 represent common electrodes (which will be hereinafter referred to as write selecting electrodes). Numerals 56–59 represent signal electrodes (which will be hereinafter referred to as recording signal electrodes), and these recording signal electrodes 56–59 are alternately projected from one of the write selecting electrodes to make the aperture ratio of shutter large and the interval of patterns wide. Numerals 60 and 61 denote micro-shutters which are formed by the write selecting and recording signal electrodes of the transparent type. Opening or closing of the micro-shutter 60 is controlled by a signal applied to the write selecting electrode 54 and recording signal electrode 56, while opening or closing of the micro-shutter 61 by a signal applied to the write selecting electrode 55 and recording signal electrode 56. Numeral 62 represents the moving direction of the photoreceptor, that is, the sub-scanning direction.

Write selecting signals 64 or 65 shown in FIG. 12 are applied to the write selecting electrodes 54 or 55, and the first or second half of Tw is assigned to these signals, respectively, as their selecting period. Recording signals 66–69 shown in FIG. 13 are applied to the recording signal electrodes 56–59. The recording signal 66 turns on the micro-shutter 60 at the selection time of the write selecting electrode 54, and one of on-on drive signal 70, on-off drive signal 71, off-on drive signal 72 and off-off drive signal 73 is applied to the micro-shutter 60 at the selection time of the write selecting electrode 55. The drive signal which is applied to the micro-shutter 61 on the write selecting electrode 55 equals to the one which is shown in FIG. 14 and whose phase is delayed by Tw/2.

*$f_L$ represents a signal which is reverse in phase to $f_L$, *$f_H$ denotes a signal which is reverse in phase to $f_H$, and the superposed signal of the signals $f_L$ and $f_H$ is represented by $f_L + f_H$.

Figure 14:
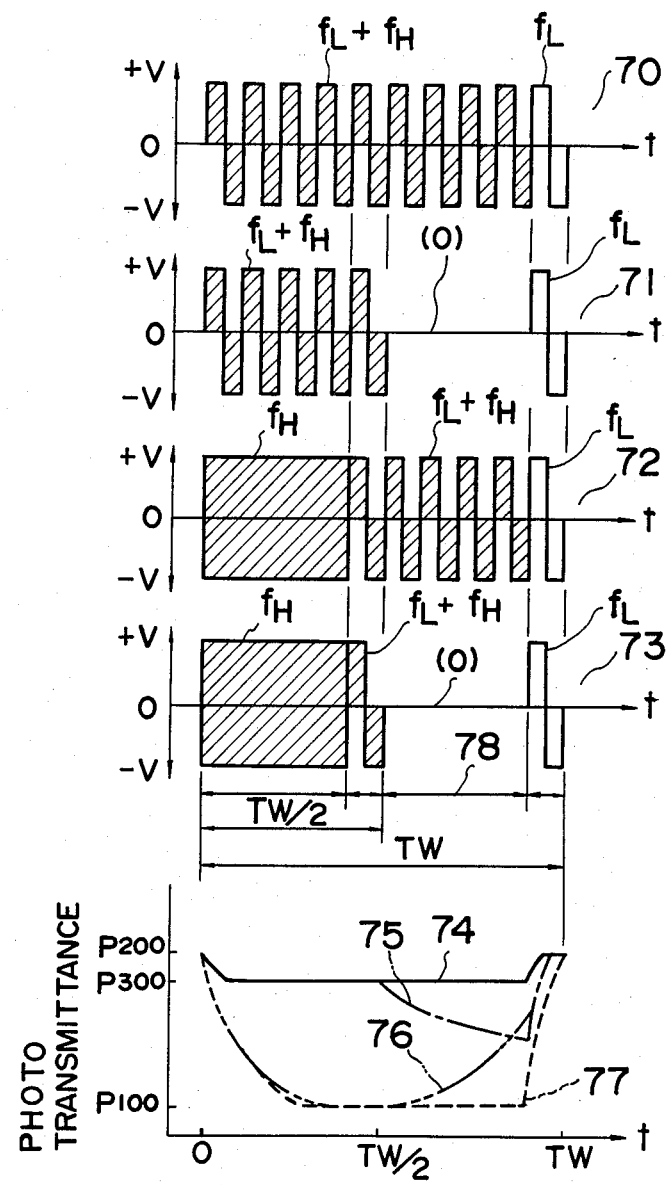
FIG. 14 is a characteristic view showing drive signals and their light response to explain the 2-time division drive employed by the present invention.

Numerals 74–77 in FIG. 14 represent light response characteristics when these drive signals are applied to the micro-shutter 60. These characteristics correspond to the drive signals 70–73, respectively. The response 75 which is partially closed by the on-signal and the response 76 which is partially opened by the off-signal depend upon which of the silent signal [0] and superposed signal $f_L + f_H$ is applied at a non-selection period 78.

If the on- and off-responses 75 and 76 can be made equal in level to those 74 and 77, respectively, when the micro-shutter 60 is considered, the drive can be performed at the non-selection time to keep the recording condition at a just previous selection time until at a subsequent selection time. Therefore, the time-sharing drive is performed as an apparent static drive and the exposing time does not become $\frac{1}{2}$, thereby enabling sufficiently high effect to be attained.

A period during which the signal $f_L$ is applied is provided at the last $T_L$ of each of the first and second halves Tw/2 in the case of the recording signals 66–69 shown in FIG. 13. The period $T_L$ of the second half corresponds to the period $T_L$ 78 of the write selecting signal 64 as shown in FIG. 12, while the period $T_L$ of the first half to a period $T_L79$ of the write selecting signal 65. This intends to perform the drive in such a way that the signal $f_L$ applied at the last df the writing cycle Tw to open the liquid crystal light shutter, thereby eliminating histeresis phenomenon, i.e. opening or closing state of the shutter which is caused during no selection period because of high frequency.

The write selecting signals 64 and 65 shown in FIG. 12 have selecting periods 80 and 81 which are denoted by the signal $*f_H$. To be more accurate, the periods which are represented by numerals 84 and 85 and which are except periods 82 and 83 each corresponding to the period $T_L$ are practical selecting period, respectively.

In a case where light strength is in a range in which the reciprocity in the photography and electronic photography can be almost established, attenuation of static charge on the surface of the photoreceptor is determined depending upon total amount of exposure. When the on- and off-responses are made nearly same in level as described above, therefore, white or black dots can be recorded similarly.

According to this driving manner in the n-time-sharing drive, therefore, the drive signals which are applied at the non-selection period can have combinations of $2^{n-1}$, and when the cummulation effect of liquid crystal is used effectively at the non-selection period and the condition at the selection period Tw/n can be kept during the non-selection period $(1-1/n)$Tw even if any kind of drive is conducted at the non-selection period, the drive becomes same as the apparent static one and the exposure time does not become 1/n, thereby enabling remarkable effect to be attained. The above-described example of the time-sharing drive was n=2. The waveforms shown in FIGS. 12 through 14 were $f_H = 300$ KHz and $f_L = 5$ KHz, and FIGS. 12 through 14 show examples of the drive conducted under a voltage 30 V, Tw=2 ms, and a liquid crystal temperature 45° C.

Figure 15:
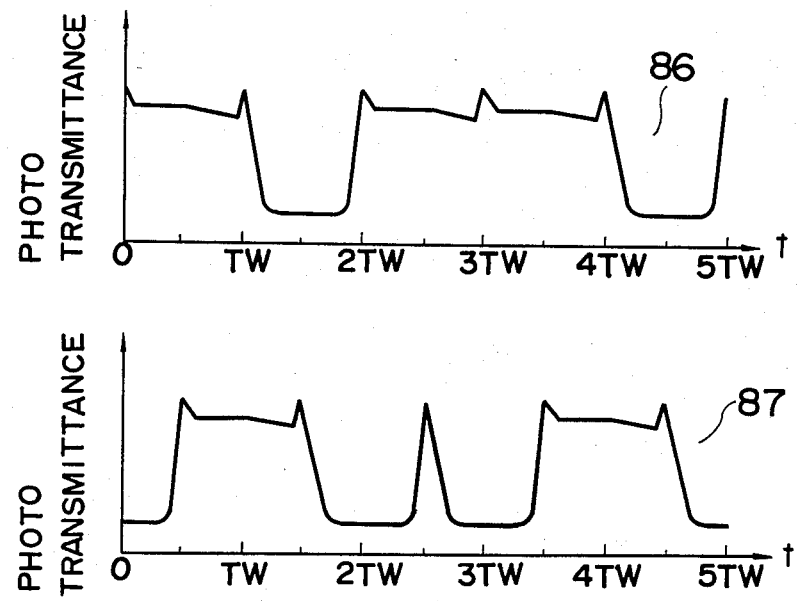
FIG. 15 is a characteristic view showing the light response when the drive manner shown in FIG. 14 is used.

Light responses gained when the writing cycle is Tw and when the drive is conducted to record white-black-white-white-black dots at the micro-shutter 60 and white-black-black-white-black dots at the micro-shutter 61 in the arrangement of the 2-time-sharing drive shown in FIG. 11 are represented by numerals 86 and 87, respectively, in FIG. 15.

When the time-sharing drive by which the micro-shutters are not closed after Tw/2 is employed, opening and closing of the micro-shutters can be driven approximating to the apparent static drive.

Figure 1A:
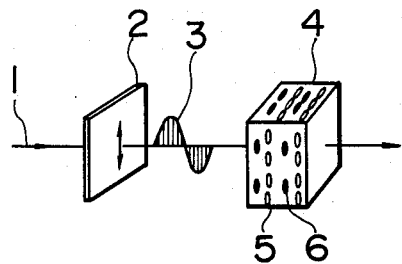
FIGS. 1(A) and (B) are intended to explain the operation mode of a liquid crystal of the GH type.
Figure 1B:
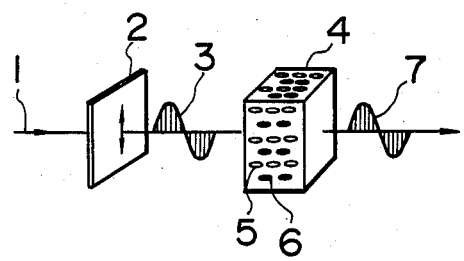
FIGS. 1(C) and 1(D) are intended to explain the operation mode of a liquid crystal of the TN type.
Figure 1C:
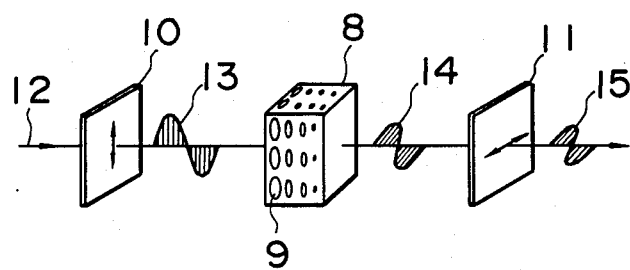
Figure 1D:
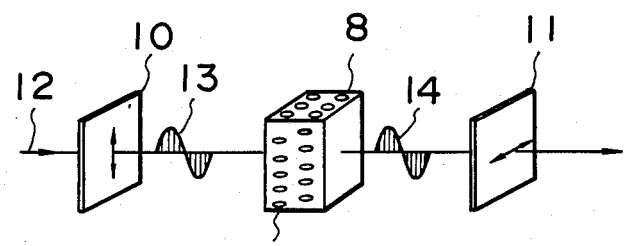
Figure 2:
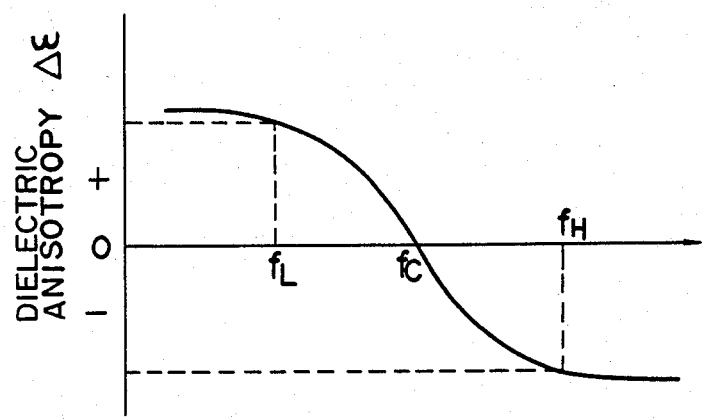
FIG. 2 is a view showing dielectric anisotropies of a double frequency driving liquid crystal.
Figure 3:
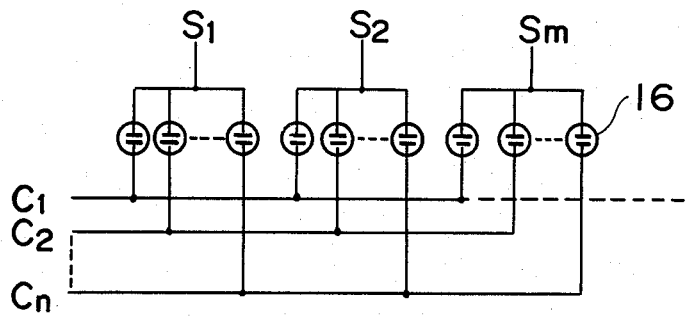
FIGS. 3A to 3C are diagrams intended to explain time-sharing drive.
Figure 3:
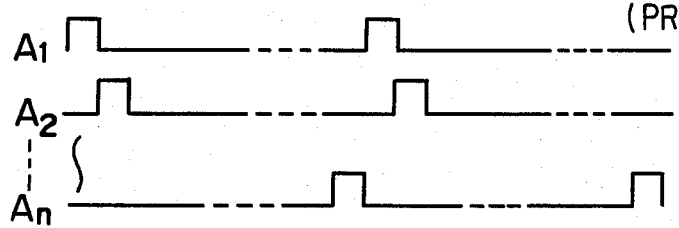
Figure 3:
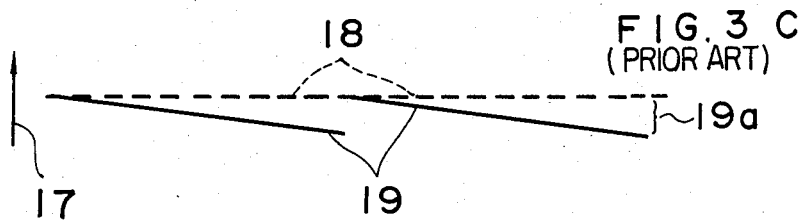
Figure 4A:
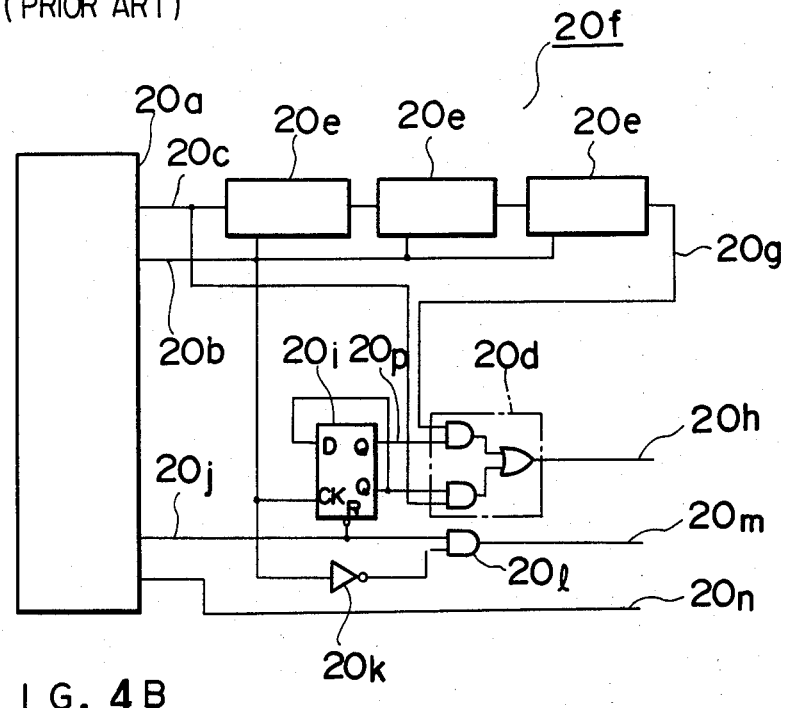
FIGS. 4A and 4B are respectively a circuit diagram showing the control circuit employed by the prior art driver circuit and wave form diagrams in the circuit.
Figure 4B:
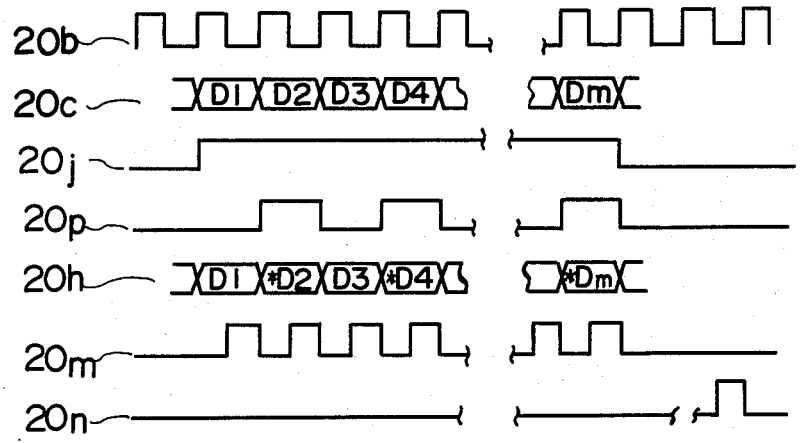
Figure 5:
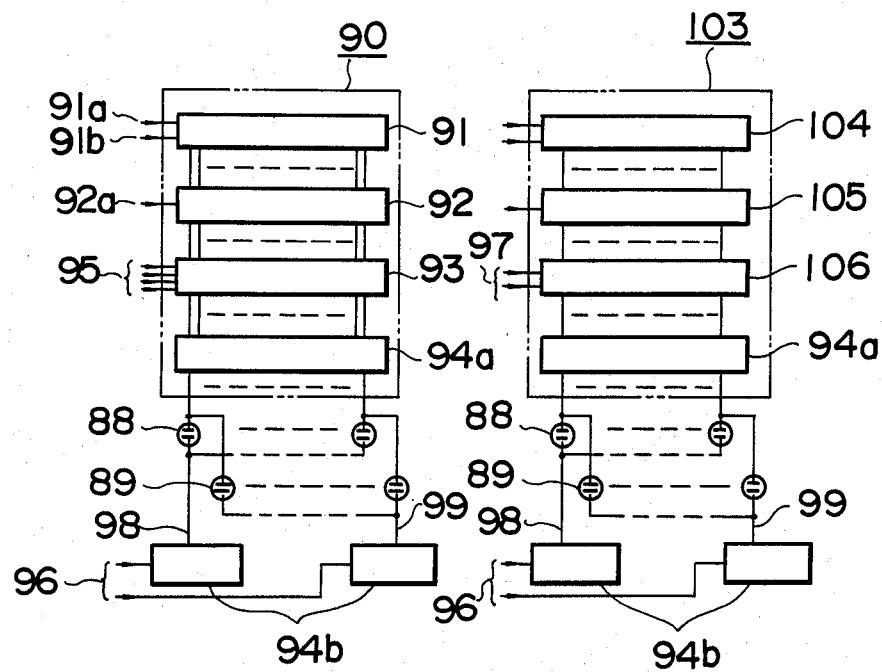
FIG. 5 shows examples of the liquid crystal light shutter driving circuit.
Figure 7:
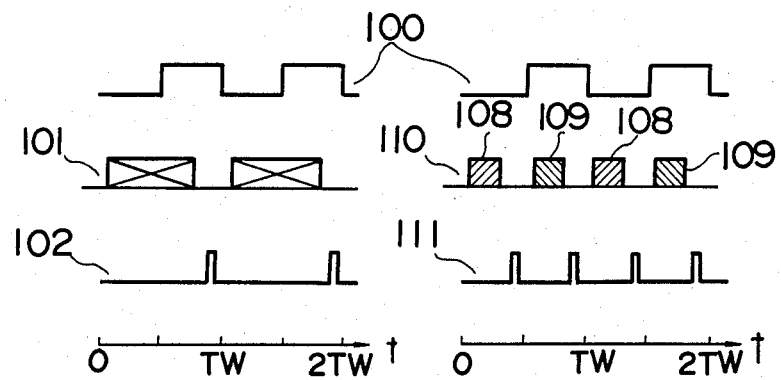
FIG. 7 is a time chart for signals supplied to the driver circuit shown in FIG. 5.
Figure 6:
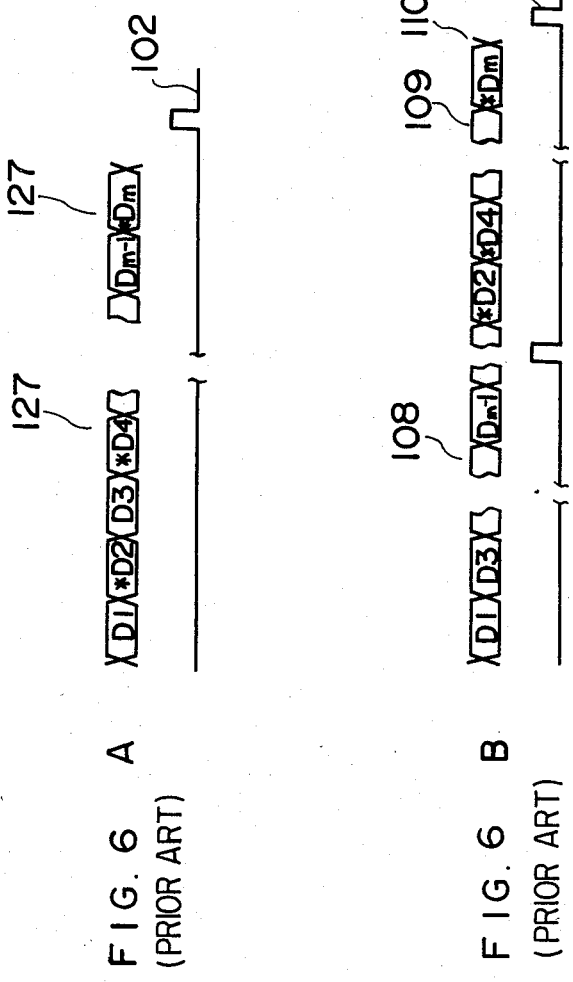
FIG. 6 is a block diagram showing recording data produced by the driver circuit shown in FIG. 4.

When the micro-shutters arranged in zigzag in the n-time-sharing drive are also arranged in zigzag even in the n-time-sharing, as shown by the 2-time-sharing in FIG. 11, and recording data are applied to them as described above, recording can be done on a straight line, as shown by 18 in FIG. 3.

A driver circuit employed by the recording apparatus of the present invention will be described referring to FIG. 16. The circuit shown in FIG. 16 is almost similar in arrangement to a circuit shown in FIG. 20 and, therefore, the former will be described particularly in detail, while the latter will be described later in brief.

Current is supplied from external sources 137, 138 and 139, and a recording data 140 is inputted to an i-bit shift register 142, synchronous with the leading edge of a clock pulse 141 (i=160 in this case). The final output of the shift register 142 is outputted as a cascade signal 143 to be supplied to a subsequent LSI. When the transfer of the recording data of m-bit/line is finished, a latch pulse 145 is supplied to an i-bit data latch 144 and an FF 146 of the D-type which serves to delay data on k lines of i/2-bit/line (k=2 in this case), thereby making the shift register 142 empty and ready for receiving recording data on a subsequent line. Uneven bits of the data latch 144 are supplied to inputs $A_1$–$A_{80}$ of a data selector multiplexor 147 without passing through the delay FF 146 of the D-type, while even bits thereof are inputted to an FF 146a of the D type. Lines which belong to the even bits and which are through 1-bit of the FF 146a of the D type are inputted to inputs A of a delay selecting gate 148, while lines which are through 2-bit of FF 146a and 146b of the D type are supplied to inputs B of the delay selecting gate 148. Outputs W of the delay selecting gate 148 are supplied to the inputs $B_1$–$B_{80}$ of the data selector multiplexor 147.

Figure 16:
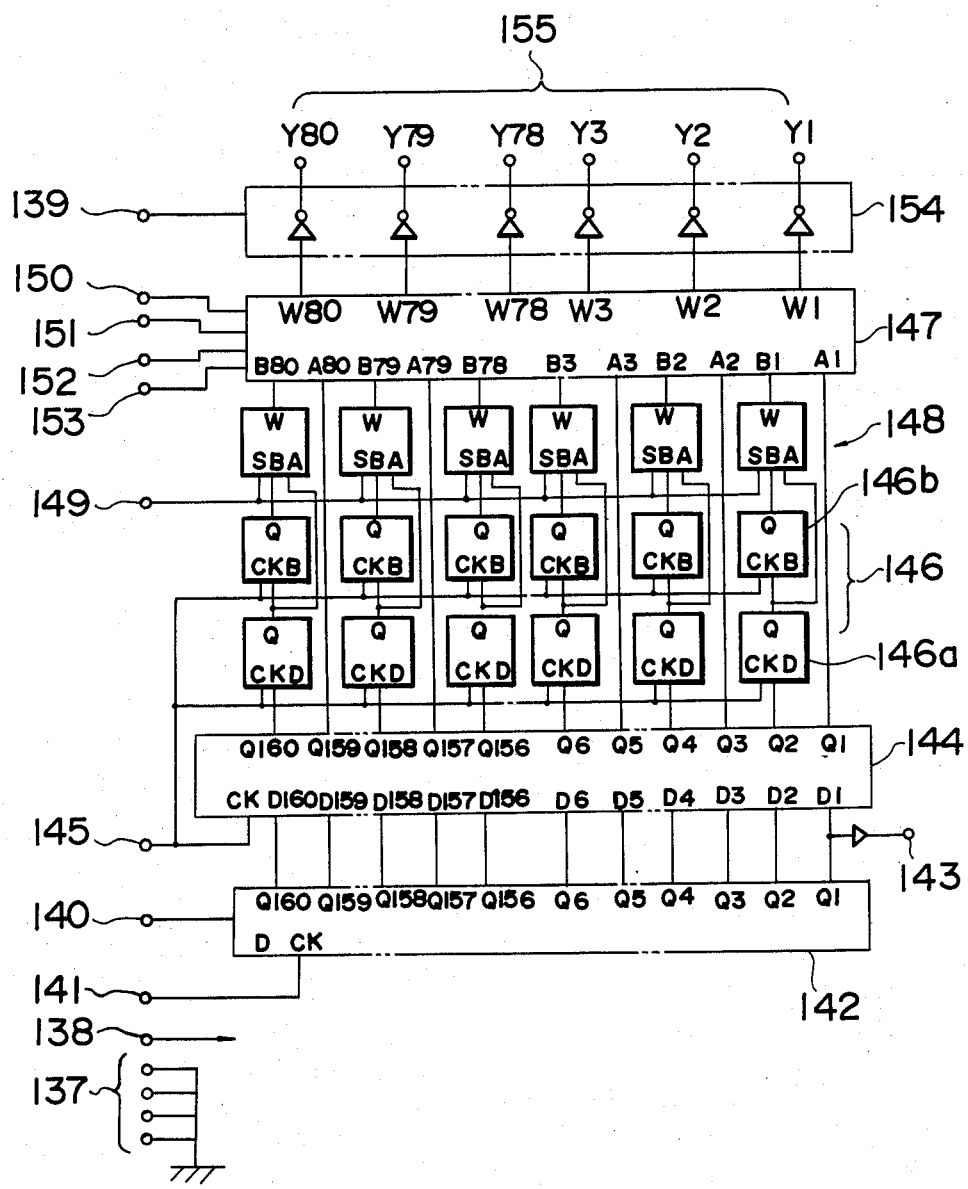
FIG. 16 is a circuit diagram showing a drive controlling circuit according to the present invention.

The delay selecting gate 148 selects k=1 or k=2 in FIG. 16, responsive to a delay selecting v signal 149. FIGS. 17(a) and 17(b) are circuit diagrams intended to explain the circuit of this gate 148 in detail and which circuit comprises five gate circuits. Delayed and not delayed data ($B_1$–$B_{80}$) and ($A_1$–$A_{80}$) are inputted to the data selector multiplexor 147 to select one of on-on recording signal 150, on-off recording signal 151, off-on recording signal 152 and off-off recording signal 153 which are similarly inputted to the data selector multiplexor 147, which applies outputs $W_1$–$W_{80}$ to a level shifter and high voltage driver 154. The level shifter and high voltage driver 154 supplies a recording signal 155, which consists of outputs $Y_1$–$Y_{80}$, to the recording signal electrodes 56–59 shown in FIG. 11.

The data selector multiplexor 147 has an arrangement shown in FIG. 18 and recording signals 150–153 correspond to those shown by numerals 66–69 in FIG. 13.

Figure 19:
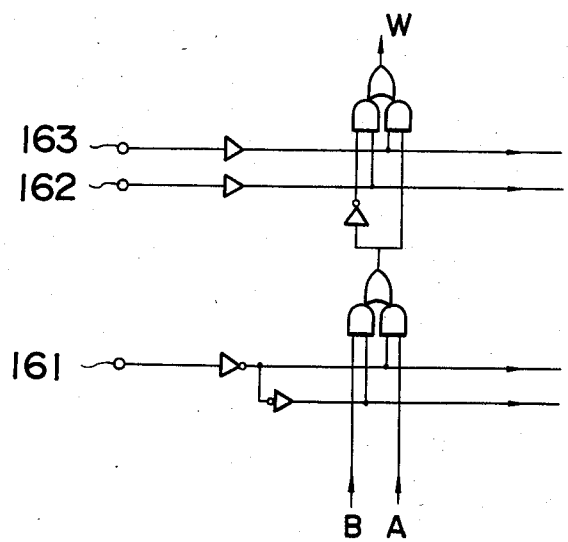
FIG. 19 is a circuit diagram showing in detail a part of a drive controlling circuit which will be shown in FIG. 20.
Figure 20:
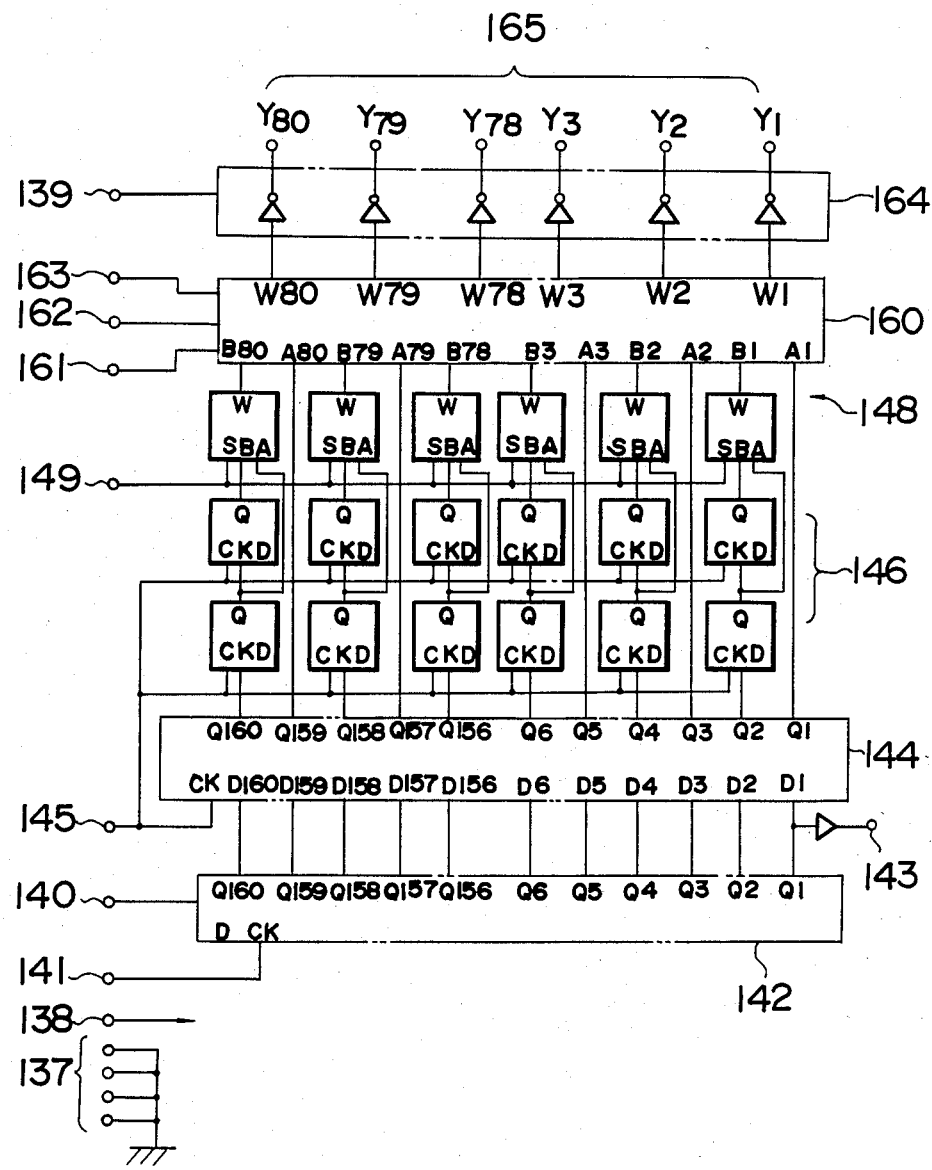
FIG. 20 is a circuit diagram showing the drive controlling circuit according to the present invention.

Or the data selector multiplexor 147 may be arranged as shown in FIG. 19 to provide a data selector multiplexor 160 shown in FIG. 20, to which delayed and not delayed recording data ($B_114$ $B_{80}$) and ($A_1$–$A_{80}$) are inputted. Or a circuit may be formed using data selecting signals 161–163.

A liquid crystal panel including the liquid crystal light shutters, and a driver IC will be described.

Figure 21:
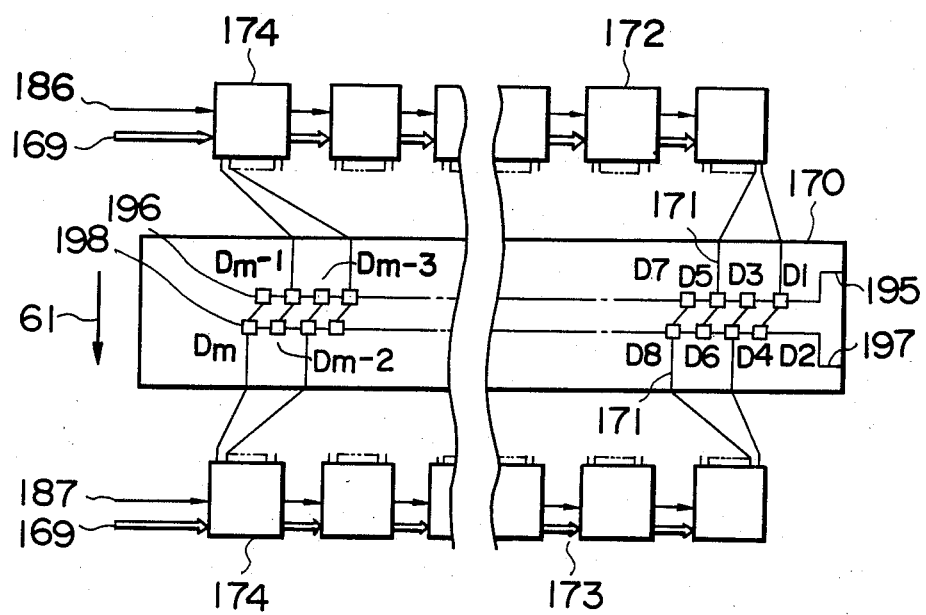
FIG. 21 is a block diagram showing a liquid crystal panel arranged according to the present invention.

A liquid crystal panel 170 is arranged as shown in FIG. 21 and recording signal electrodes 171 are connected to the outputs 155 ($Y_1$–$Y_{80}$, FIG. 16) of driver ICs (LSI) 174. The plural driver LSI 174 are arranged above and below or left and right the liquid crystal panel 170 to form driver circuits 172 and 173.

Control for the driver circuit shown in FIG. 16 will be described.

Figure 22A:
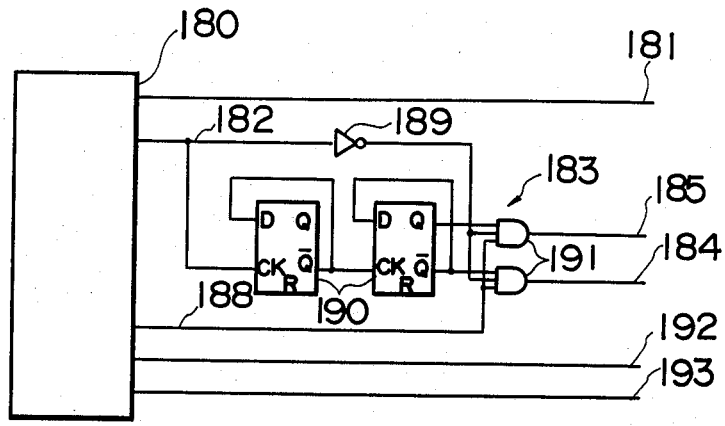
FIGS. 22A, 22B and 22C are respectively a circuit diagram showing a control circuit for controlling the liquid crystal panel and wave form diagrams in the circuit.
Figure 22B:
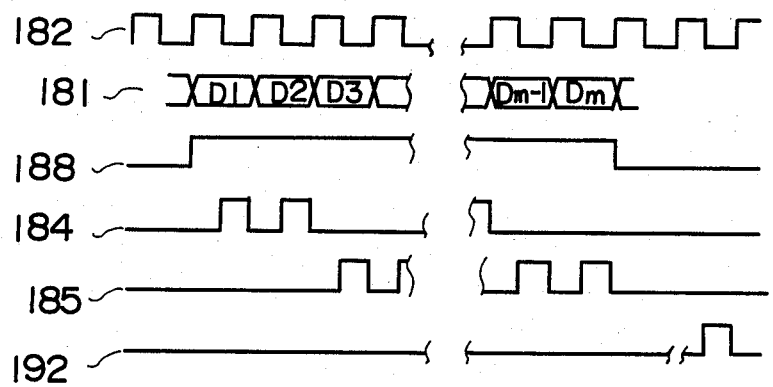
Figure 22C:
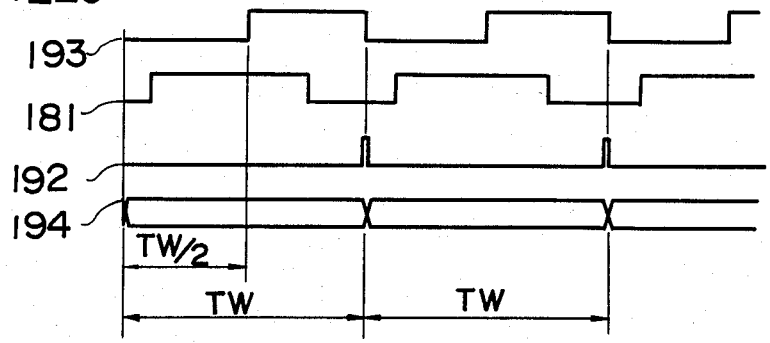
Figure 25A:
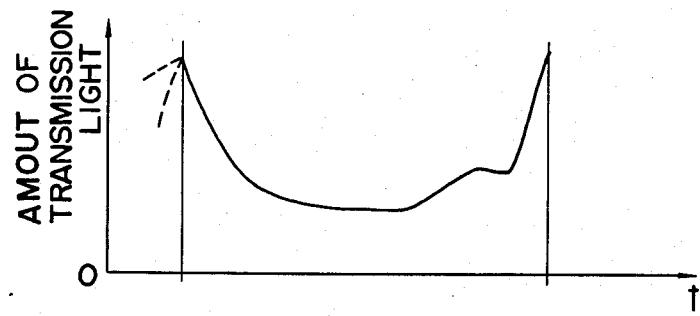
FIGS. 25A to 25D are characteristic views showing light transmissions or penetration of shutters responsive to these drive waveforms.
Figure 25B:
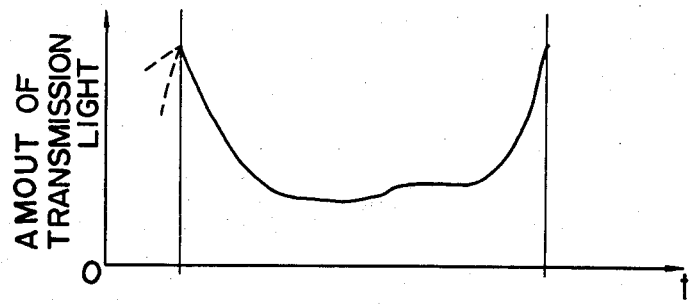
Figure 25C:
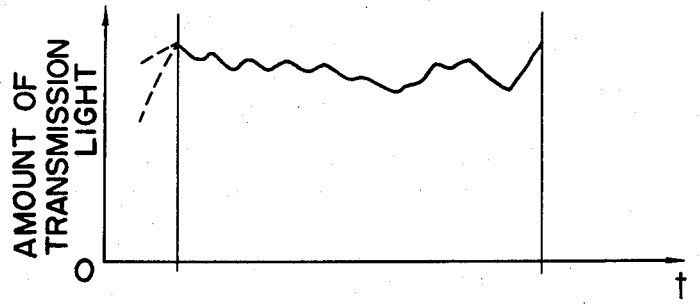
Figure 25D:
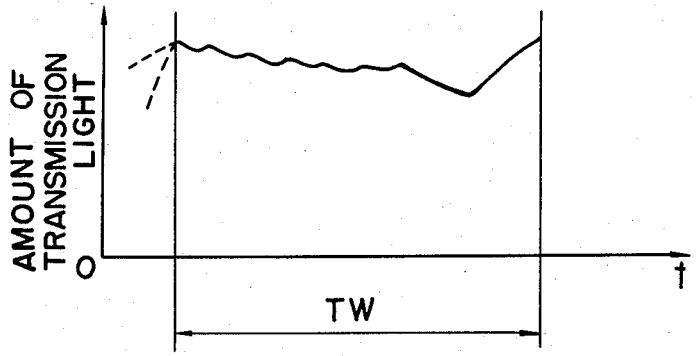

FIG. 22(A) shows a circuit for controlling the liquid crystal panel 170 and driver LSI 174 shown in FIG. 21, and various kinds of control signals are applied from an image signal generator section 180 to the driver circuit shown in FIG. 21. For example, clock pulses 184 or 185 are produced from a clock pulse 182 at a clock separator section 183 and supplied to 186 or 187 in FIG. 21. More specifically, as shown by a timing chart in FIG. 22(B), a time-belonging picture element signal 181 is outputted, responsive to an enable signal transferred from the image signal generator section 180 and synchronous with the rising of the clock pulse 182, and clock pulses 184 and 185 are produced from the clock pulse 182 and the transferred enable signal 188 through the clock sparator 183, which comprises an inverter 189, D-type FF 190 and AND gate 191. Latch pulse 192 and data selecting signal 193 are outputted as shown by a timing chart in FIG. 22(C). The driver circuit shown in FIG. 21 receives the time-belonging picture element signal 181 of m-bit/line within one writing cycle Tw and generates a recording signal 194, which causes writing to be done according to data received, responsive to the latch pulse 192 at the final of Tw, while making the shift register 142 in FIGS. 16 and 20 free and ready for a reception from a subsequent line. Namely, the recording data 140 which has been inputted in serial to the shift register 142 is transferred to the data latch 144, responsive to the latch pulse 192. On the other hand, the write selecting signal 193 causes liquid crystal micro-shutters 196, which are positioned on a write selecting electrode 195 in FIG. 21, to be driven at the first half Tw/2 of Tw and liquid crystal microshutters 198, which are positioned on a write selecting electrode 197, to be driven at the second half Tw/2 of Tw.

Recording data $D_1$-$D_{m-1}$ and *$D_2$-*$D_m$ which are inputted to the micro-shutters 196 and 198 are the outputs of the driver LSIs 174, that is, outputs $Y_1$-$Y_{80}$ in FIGS. 16 and 20. For example, the driver LSIs 174 arranged on the side of the driver circuit 172 control $D_1$, $D_2$, $D_5$, $D_6$, -$D_{m-3}$, $D_{m-2}$, and the driver LSIs 174 on the side of the driver circuit 173 controls $D_3$, $D_4$, $D_7$, $D_8$, -$D_{m-1}$, $D_m$.

Operation in the driver circuit shown in FIG. 20 which is different from that in the case shown in FIG. 16 is that not-delayed recording data ($A_1$-$A_{80}$) are selected at the first half of Tw when the data selecting signal 161 which changes at ½ of the writing cycle Tw is "0", and that delayed data ($B_1$-$B_{80}$) are selected at the second half thereof when the data selecting signal 161 is "1". Either of the on- and off-recording signals 162 and 163 is thus selected to become outputs $W_1$-$W_{80}$ of the data selector multiplexor 160, which produce the recording signal 165, which includes outputs $Y_1$-$Y_{80}$, through the level shifter and high voltage driver 164. The high voltage driver is of push-pull type to achieve high speed operation.

As described above, the drive control circuit of the present invention needs no external buffer memory. In addition, LSIs each including data delaying and mixing sections integrated as a unit are arranged as shown in FIGS. 16 or 20 to allow cascade connection, so that any size of liquid crystal panel can be formed by one kind of LSIs by increasing or reducing the number of the LSIs used. Further, provision of the delay selecting signal which meets any change of the interval between the liquid crystal micro-shutters of the liquid crystal panel in the sub-scanning direction makes the circuit more flexible.

The above is the description of the driver circuit which serves to drive the recording apparatus of the present invention in the time-sharing manner. There will be described a circuit which can prevent the liquid crystal light shutter from being influenced by temperature change or the like, in the case where the liquid crystal light shutters are time-sharing driven using a driver circuit which is a second embodiment of the present invention.

As described above, the write selecting signals which are applied to the write selecting electrodes 54 and 55 in FIG. 11 have the waveforms 64 and 65 FIG. 12. Micro-shutters 60 and 61 can also be opened or closed by applying waveforms 200 and 201 in FIG. 23 to the write selecting signal electrodes 54 and 55 and further applying the waveforms 66–69 in FIG. 13 to the recording signal electrodes 56–59. The driving waveforms this time become four kinds of micro-shutter driving waveforms shown in FIG. 24. FIGS. 24A and 24B represents waveforms for closing the micro-shutters, while FIGS. 24C and 24D waveforms for opening the micro-shutters. As apparent from the comparison between FIGS. 23 and 24A to 24D, the waveforms in FIGS. 24A to 24D are of the alternating type having an amplitude two time that of the waveforms in FIG. 23.

FIGS. 25A to 25D show the micro-shutters opened and closed corresponding to the driving waveforms of FIGS. 24A and 24D, respectively.

As seen from FIGS. 25A to 25D the micro-shutters are always opened at the first and last of a writing cycle Tw=1. This is because of $f_L$ applied at the last of Tw in FIGS. 24A to 24D. The object of appling $f_L$ like this is to eliminate the hysteresis of liquid crystal. The double-frequency driving liquid crystal is turned off by $f_H$, but when $f_H$ is left applied for a long time, the liquid crystal cannot be turned on quickly because of the hysteresis effect even if the signal $f_L$ is applied. This is not preferable to shutter operation and when the shutter is closed for a long time, therefore, it cannot be turned on at the just time when desired so. Accordingly the signal $f_L$ is impressed for a short time (once at the last of Tw in this case) to reduce the hysteresis effect.

FIGS. 26A to 26D show examples of shutter operation which was conducted under $f_H$=150 KHZ, $f_L$=2KHz, and 46° C. and using the above-described driver circuit for the liquid crystal light shutter. FIG. 26A represents an operation characteristic obtained in a case where the process of adding the closing signal (or in FIG. 24A) for a 63Tw of from T1 to T63 and impressing the opening signal (or in FIG. 24D)for a T64 is repeated. Contrary to FIG. 26-A, FIG. 26-B represents an operation characteristic obtained in a case where the process of impressing the opening signal for 63Tw of from T1 to T63 and adding the closing signal for T64 is repeated.

FIG. 26C represents an operation characteristic obtained in a case where the opening signal is continuously applied, and 26D an operation characteristic obtained in a case where the closing signal is continuously applied. The characteristic represented in FIG. 26A at T64 is similar to that denoted in FIG. 26C at the same period. The characteristic denoted in FIG. 26B at T64 is similar to that represented in FIG. 26D at the same period. This means that the micro-shutters operate certainly for Tw without being influenced by the hysteresis effect. In other words, this shows a state under which black and white dots can be printed completely.

Figure 27A:
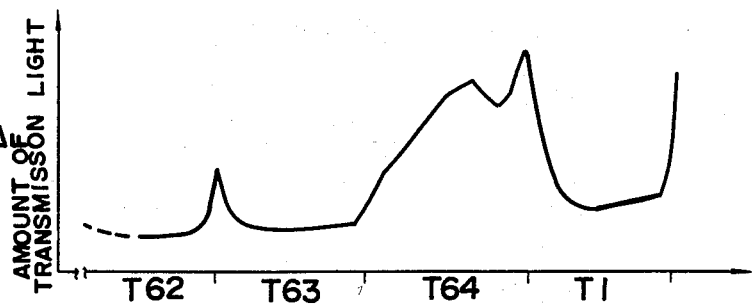
Figure 27B:
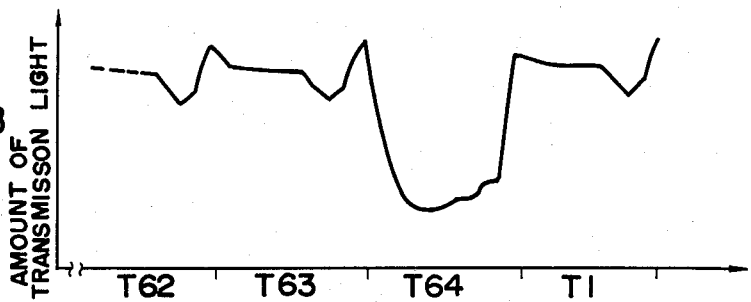
Figure 27C:
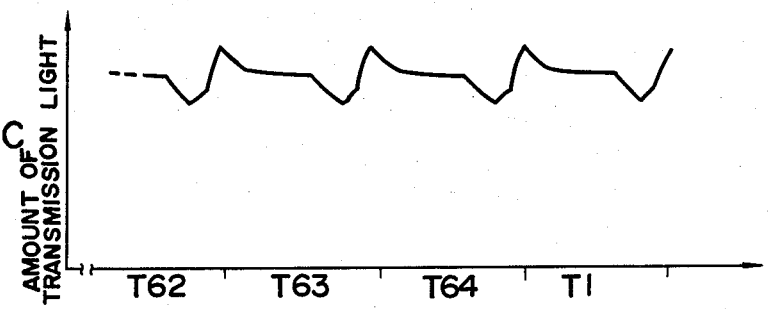
Figure 27D:
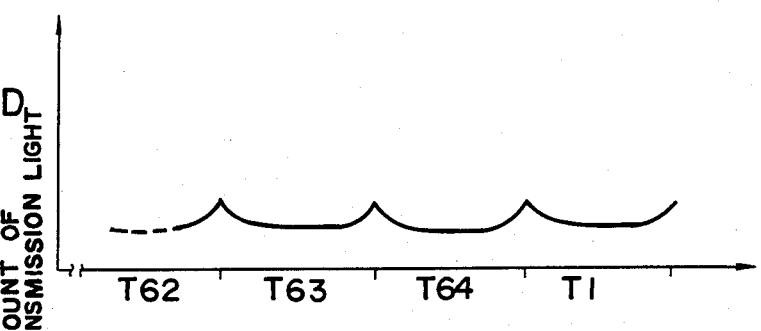

FIGS. 27A to 27D show the micro-shutters, same as those in FIGS. 26A to 26D, driven by the driving signals, same as those in FIGS. 26A to 26D, but the state temperature of the liquid crystal is 43° C. which is about 3° C. lower than that in FIGS. 26A to 26D. The characteristic represent by FIG. 27D shows that the operation of opening the shutter at the last of every Tw responsive to the signal $f_L$ is not complete. This is because the liquid crystal becomes high in viscosity due to its low temperature to thereby make its behaviour slow. 27-A shows that the micro-shuttersis not opened to its extent at the first of T64. When the temperature becomes lower, the micro-shutters is not opened at all at T64. In other words, white dots cannot be printed after the succession of black dots.

FIG. 28 shows characteristics obtained when the temperature of liquid crystal is raised to 53° C. No problem is caused in the operation of opening the micro-shutters, but in the operation of closing the shutter, the micro-shutters which tend to be closed at the first half of every Tw is opened at the second half of Tw because it cannot keep its closed state. This is because the liquid crsytal becomes lower in viscosity due to its raised temperature, $f_C$ is thus increased to strengthen the influence of $f_H+f_L$ in the waveform 24-a in FIG. 24, and no balance can be kept against the force of closing the micro-shutters due to no voltage.

If so, light leaked at the time of closing the micro-shutters is increased and the contrast between white and black has dropped.

Since the liquid crystal light shutter changes its characteristic subtly, depending upon its temperature as described above, it is necessary to accurately control the temperature.

TABLE 1

| Temperature [°C.] | $f_H$ [KHz] | a | b | c | d | $e = \frac{a}{b}$ | $f = \frac{c}{d}$ |
|---|---|---|---|---|---|---|---|
| 53 | 150 | 4.6 | 3.5 | 4.6 | 3.5 | 1.31 | 1.31 |
| 51 | " | 4.6 | 3.2 | 4.6 | 3.1 | 1.44 | 1.48 |
| 48 | " | 4.6 | 2.8 | 4.6 | 2.6 | 1.64 | 1.77 |
| 46 | " | 4.5 | 2.4 | 4.5 | 2.2 | 1.88 | 2.05 |
| 44 | " | 4.5 | 2.1 | 4.6 | 1.1 | 2.14 | 4.18 |
| 43 | " | 3.5 | 2.2 | 4.6 | 0.8 | 1.59 | 5.75 |

Table 1 shows values obtained by integrating the quantity of light at T64. a represents values of A in FIGS. 26A through 28D at T64. Similarly, b denotes values of B at T64, c values of C at T64, and d values of D at T64.

When paying attention to the columns of $e=a/b$ and $f=c/d$ in Table 1, it can be understood how the contrast changes.

The above characteristics are those obtained when $f_H$ is kept constant or 150 KHz.

The embodiment of the present invention is intended to change the frequency of $f_H$, depending upon the temperature, to thereby prevent the liquid crystal light shutter from leaking light.

Table 2 shows characteristics measured under the optimum $f_H$ which is changed by the temperature.

TABLE 2

| Temperature [°C.] | $f_H$ [KHz] | a | b | c | d | $e = \frac{a}{b}$ | $f = \frac{c}{d}$ |
|---|---|---|---|---|---|---|---|
| 53 | 313 | 4.5 | 1.7 | 4.5 | 1.8 | 2.65 | 2.50 |
| 51 | 238 | 4.6 | 1.8 | 4.6 | 1.9 | 2.55 | 2.42 |
| 48 | 170 | 4.6 | 1.9 | 4.7 | 2.0 | 2.42 | 2.35 |
| 46 | 141 | 4.7 | 2.0 | 4.8 | 2.2 | 2.35 | 2.18 |
| 44 | 126 | 4.6 | 2.1 | 4.7 | 2.1 | 2.19 | 2.24 |
| 43 | 120 | 4.6 | 2.3 | 4.7 | 2.1 | 2.00 | 2.24 |

As apparent from Tables 1 and 2, it can be understood that reduction of the contrast can be kept small if the frequency of $f_H$ is made higher every time when the temperature of the liquid crystal light/shutter is raised to 53° C., 58° C. and so on. In other words, the micro-shutters whose characteristics are as shown in FIGS. 28A to 28D. When the temperature rises can be controlled to have those characteristics which are as shown in FIGS. 26A to 26D by raising the frequency of $f_H$ to make its effect larger and by approximating the characteristic of $f_H+f_L$ to the side of $f_H$.

Figure 29:
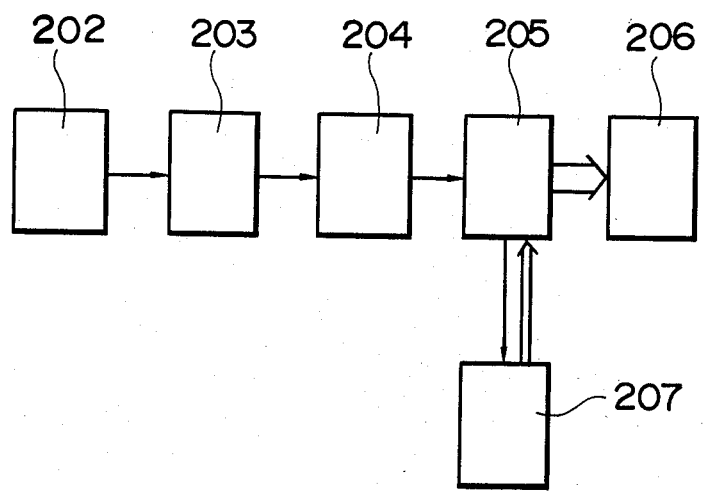
FIG. 29 is a block diagram showing an embodiment of the present invention.

FIG. 29 is a block diagram showing the embodiment of the present invention. Numeral 202 represents a temperature sensor such as the thermistor and thermocouple attached to the liquid crystal light shutter. Signal applied from the temperature sensor is amplified by an amplifier 203 and inputted to a voltage-controlled oscillator 204 (which will be hereinafter referred to as VCO). The VCO 204 changes its output frequency on the basis of temperature detected by the temperature sensor 202. It is preferable that the relation between this temperature and the frequency becomes nearer to that in Table 2, but it may not coincide with that. Numeral 205 represents a liquid crystal light shutter driving circuit, which uses the output frequency of the VCO 204 as the signal $f_H$ which is to be applied to a liquid crystal light shutter 206. A drive controlling circuit 207 applies a signal to the liquid crystal light shutter driving circuit 205 to control start, finish and like of printing operation.

Although $f_H$ has been changed in stepless manner by the VCO 204, it is unnecessary to successively change $f_H$, but $f_H$ may be supplied in three steps.

A limiter may be provided in the case of the VCO 204 to control the upper and lower limits of $f_H$.

When the temperature of the liquid crystal light shutter is detected, as described above, to make $f_H$ of the micro-shutters driving waveform variable, the liquid crystal light shutter can be controlled in such a way that high contrast and excellent response characteristics are obtained in a wide temperature range.

FIG. 30 is a view intended to explain the liquid crystal micro-shutter driving circuit 205 shown in FIG. 29. Numeral 208 denotes the signal $f_H$, which was conventionally produced by the internal oscillator but is inputted from the VCO 204 or the like in the embodiment of the present invention.

Numeral 209 denotes a low-frequency oscillator and $f_L=5$ KHz in this case. A waveform generator 210 generates, on the basis of the signals $f_L$ and $f_H$, logic level signals (TTL or CMOS level signals) 211–216 which correspond to the waveforms 200, 201 in FIG. 23 and waveforms 66–69 in FIG. 13.

At the same time, the waveform generator 210 also generates the signal Tw which corresponds to one writing cycle, and outputs it to the drive controlling circuit 207 in FIG. 29.

On the other hand, video data 217 which correspond to white and black dots are inputted in serial from the drive controlling circuit 207 to a shift register 219, responsive to a video data shift clock 218.

This serial input is intended to input data which correspond to one line in the main scanning direction, and its operation is finished within one writing cycle Tw.

A latch pulse 220 is inputted to a data latch 221 and flip-flop 222 every 1—Tw, thereby shifting the one line video data, which have been inputted to the shift register 219, to the data latch 221 at the same time.

After the video data are shifted to the data latch 221, the shift register 217 starts shifting subsequent one line data. The video data which have already been in the data latch 221 are synchronized with the latch pulse in such a way that uneven-ordered data 223a are inputted directly to a data selector 224 and that even-ordered data 223b are inputted to the flip-flop 222. The data which have been inputted to the flip-flop 222 are inputted to a data selector 224, responsive to a subsequent latch pulse. In short, the uneven-ordered data are shifted by one writing cycle Tw from the even-ordered data when they are inputted to the data selector 224. This is because the write selecting electrodes are two as shown in FIG. 11 and because recording dots are arranged in zigzag.

The micro-shutters 60 are opened or closed, at the first half of the writing cycle Tw, through these lines which correspond to the uneven-ordered data, while the micro-shutters 61 are opened or closed, after ½Tw since then, through those lines which correspond to the even-ordered data, one line ahead the uneven-ordered data.

When the space between the microshutters 60 and 61 is made wide, therefore, it may be arranged, as shown by the first example, that the flip-flop 222 is increased in number to have 2, 3 and more steps and that the even-ordered data are inputted to the data selector 224 after being delayed 2Tw, 3Tw and more Tw. The data selector 224 selects one of the signals 213–216, depending upon four states (223a is 1 and 225 is 1, similarly 1 and 0, 0 and 1, and 0 and 0) which are determined by the video data 223a and delayed video data 225. It is assumed that 1 corresponds to black and that 0 corresponds to white, (1, 1)allows 213 to be selected, (1,0) 214, (0,1) 215 and (0,0) 216. A signal 226 selected is inputted to a high pressure-tight buffer 227 to change its amplitude from logic level to drive level of liquid crystal. Responsive to the signal 226 having this amplitude and also to 211 and 212 which have been amplified by a high pressure-tight buffer 228, the waveforms shown in FIGS. 24A and 24B ahd applied to the liquid crystal to open and close the micro-shutters.

As described above, the present invention enables a liquid crystal light shutter to be provided, whibh liquid crystal light shutter allowing the temperature of the liquid crystal to be relatively roughly controlled and having high contrast and excellent response characteristics.

According to the present invention as described above in detail, the data delaying and mixing sections can be housed in an LSI, thereby enabling external buffers to be eliminated. In addition, the delayed and mixed data can be produced in the LSI. Further, cascade connection is allowed to thereby use only one kind of LSIs.

Still further, the space between the micro-shutters in the sub-scanning direction can be changed. Furthermore, selection capacity can be greatly increased due to the delay selecting signal, thereby making the recording apparatus remarkably valuable in the industrial field.

What is claimed is:

1. Liquid crystal shutter recording apparatus comprising:
    (a) a liquid crystal shutter array comprising a plurality of shutters arranged in two rows of n columns that are staggered from row-to-row;
    (b) said shutter array having write selecting electrodes corresponding to the respective rows in said array, and having recording signal electrodes corresponding to the respective columns in said array;
    (c) a light source for applying light to said liquid crystal shutter array;
    (d) an optical element for focusing light transmitted by said liquid crystal shutter array onto a recording medium; and
    (e) first control means connected to said write selecting electrodes for supplying a write selecting signal composed of predetermined wave signals to the write selecting electrodes;
    (f) second control means connected to said recording signal electrodes for supplying recording signals based on recording data to the recording signal electrodes, said recording signals being out of phase with said write selecting signals;
    (g) said second control means comprising: an input terminal to which said recording data is applied; a shift register having a fixed number of bits for serially receiving said recording data and for outputting said recording data in parallel; latching means having odd and even outputs for latching said recording data from the outputs of said shift register; a plurality of multistage flip-flops respectively connected to the even outputs of said latching means; a multiplexer responsive to the outputs of the multistage flip-flops, to the odd outputs of the latching means, and to one of a plurality of predetermined signals for forming a plurality of driving signals; and a driver circuit responsive to said driving signals for forming recording signals applied to a first set of said recording signal electrodes of said shutter array.

2. Liquid crystal shutter recording apparatus according to claim 1 wherein said first and second control means is integrated into a first LSI chip.

3. Liquid crystal shutter recording apparatus according to claim 2 wherein said first LSI chip has an output terminal for outputting said recording data from said shift register when said recording data has more than said fixed number of bits, and including a second LSI chip like said first LSI chip, the output terminal of the second control means of said first LSI chip being connected, in cascade fashion, to the input terminal of the second control means in said second LSI chip whose driver circuit is connected to a second set of said recording signal electrodes of said shutter array.

4. Liquid crystal shutter recording apparatus according to claim 2 wherein said second control means comprises a delay select terminal by which the number of stages of said multistage flip-flops is internally designated.

5. Liquid crystal shutter recording apparatus according to claim 2 wherein said liquid crystal shutter is of the guest-host type.

* * * * *